(12) United States Patent
Fliearman et al.

(10) Patent No.: US 11,193,560 B1
(45) Date of Patent: Dec. 7, 2021

(54) WORK VEHICLE MULTI-SPEED DRIVE ASSEMBLY WITH BIFURCATED CLUTCHES

(71) Applicant: Deere & Company, Moline, IL (US)

(72) Inventors: Steven R. Fliearman, Coffeyville, KS (US); Clayton G. Janasek, Independence, KS (US); Lisa R. Lloyd, Independence, KS (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/887,998

(22) Filed: May 29, 2020

(51) Int. Cl.
| | |
|---|---|
| *F16H 3/66* | (2006.01) |
| *B60K 17/04* | (2006.01) |
| *B60K 17/34* | (2006.01) |

(52) U.S. Cl.
CPC ............ *F16H 3/66* (2013.01); *B60K 17/046* (2013.01); *B60K 17/34* (2013.01); *B60Y 2200/411* (2013.01); *F16H 2200/2007* (2013.01); *F16H 2200/2079* (2013.01)

(58) Field of Classification Search
CPC ............... F16H 3/66; F16H 2200/2007; F16H 2200/2079; F16H 2200/2094; B60K 17/046; B60K 17/34; B60Y 2200/411
USPC ......................................... 475/284, 285, 303
See application file for complete search history.

(56) References Cited

U.S. PATENT DOCUMENTS

| | | | |
|---|---|---|---|
| 2,685,948 | A | 8/1954 | Freeman et al. |
| 3,062,073 | A | 11/1962 | Brass |
| 3,081,759 | A | 3/1963 | Mauck et al. |
| 3,150,544 | A | 9/1964 | Brass |
| 3,640,152 | A | 2/1972 | Shirai et al. |
| 3,675,511 | A | 7/1972 | Wakamatsu et al. |
| 3,942,024 | A | 3/1976 | Ingham |

(Continued)

FOREIGN PATENT DOCUMENTS

| | | |
|---|---|---|
| DE | 69218975 T2 | 6/1994 |
| DE | 19745995 A1 | 9/1998 |

(Continued)

OTHER PUBLICATIONS

USPTO non-final office action issued in pending Utility U.S. Appl. No. 16/385,860 dated Nov. 4, 2020.

(Continued)

*Primary Examiner* — Roger L Pang
(74) *Attorney, Agent, or Firm* — Klintworth & Rozenblat IP LLP

(57) ABSTRACT

A drive assembly for a work vehicle includes a drive housing including a first housing element forming a reaction member; a drive shaft; a planetary gear set coupled to the drive shaft and configured to selectively rotate an output element in the first rotation direction and in the second rotation direction; a first clutch arrangement including a first clutch ring and a second clutch ring; and a second clutch arrangement to interface with the planetary gear set to selectively effect a second rotation speed of the output element in the first rotation direction and in the second rotation direction. The first clutch ring is configured to effect a first rotation speed of the output element in the second rotation direction and the second clutch ring is configured to effect the first rotation speed of the output element in the first rotation direction.

20 Claims, 18 Drawing Sheets

(56) References Cited

U.S. PATENT DOCUMENTS

| | | | |
|---|---|---|---|
| 4,122,354 | A | 10/1978 | Howland |
| 4,213,299 | A | 7/1980 | Sharar |
| 4,473,752 | A | 9/1984 | Cronin |
| 4,484,495 | A | 11/1984 | Mason |
| 4,631,455 | A | 12/1986 | Taishoff |
| 4,708,030 | A | 11/1987 | Cordner |
| 4,750,384 | A | 6/1988 | Belliveau |
| 4,862,009 | A | 8/1989 | King |
| 4,926,713 | A | 5/1990 | Madill |
| 5,033,994 | A | 7/1991 | Wu |
| 5,177,968 | A | 1/1993 | Fellows |
| 5,418,400 | A | 5/1995 | Stockton |
| 5,558,173 | A | 9/1996 | Sherman |
| 5,856,709 | A | 1/1999 | Ibaraki |
| 6,015,363 | A * | 1/2000 | Mathis .................. F16H 3/663 475/281 |
| 6,371,877 | B1 | 4/2002 | Schroeder et al. |
| 6,378,479 | B1 | 4/2002 | Nishidate et al. |
| RE37,743 | E | 6/2002 | Yang |
| 6,409,622 | B1 | 6/2002 | Bolz et al. |
| 6,484,596 | B2 | 11/2002 | Puchas |
| 6,569,054 | B2 | 5/2003 | Kato |
| 6,582,333 | B2 | 6/2003 | Man |
| 6,661,109 | B2 | 12/2003 | Fukasaku et al. |
| 6,746,354 | B1 | 6/2004 | Ziemer |
| 6,770,005 | B2 | 8/2004 | Aikawa et al. |
| 6,832,970 | B2 | 12/2004 | Eibler |
| 6,852,063 | B2 | 2/2005 | Takahashi et al. |
| 6,910,453 | B2 | 6/2005 | Sugino et al. |
| 6,965,173 | B2 | 11/2005 | Fukasaku et al. |
| 7,028,794 | B2 | 4/2006 | Odahara et al. |
| 7,044,255 | B2 | 5/2006 | Maeda et al. |
| 7,086,978 | B2 | 8/2006 | Aikawa et al. |
| 7,117,965 | B2 | 10/2006 | Yatabe et al. |
| 7,223,191 | B2 | 5/2007 | Alkawa et al. |
| 7,374,031 | B2 | 5/2008 | Skorucak |
| 7,387,043 | B2 | 6/2008 | Sakamoto et al. |
| 7,503,871 | B2 | 3/2009 | Kozarekar |
| 7,582,033 | B2 | 9/2009 | Kefti-Cherif et al. |
| 7,753,147 | B2 | 7/2010 | Usoro |
| 7,780,562 | B2 | 8/2010 | King et al. |
| 8,143,735 | B2 | 3/2012 | Bauer |
| 8,226,517 | B2 | 7/2012 | Tsai et al. |
| 8,235,859 | B2 | 8/2012 | Yun |
| 8,480,529 | B2 | 7/2013 | Pohl et al. |
| 8,500,601 | B2 | 8/2013 | Arnold et al. |
| 8,584,359 | B1 | 11/2013 | Bowman |
| 8,727,944 | B2 | 5/2014 | Noboru et al. |
| 8,734,281 | B2 | 5/2014 | Ai et al. |
| 8,996,227 | B2 | 3/2015 | Sisk et al. |
| 9,017,207 | B2 | 4/2015 | Pohl et al. |
| 9,074,656 | B2 | 7/2015 | Benz et al. |
| 9,145,136 | B2 | 9/2015 | Suntharalingam et al. |
| 9,184,646 | B2 | 11/2015 | Fulton |
| 9,261,064 | B2 | 2/2016 | Patel et al. |
| 9,371,810 | B2 | 6/2016 | Creviston |
| 9,421,855 | B2 | 8/2016 | Suntharalingam et al. |
| 9,541,172 | B1 | 1/2017 | Wright |
| 9,555,795 | B2 | 1/2017 | Nefcy et al. |
| 9,676,265 | B2 | 6/2017 | Choi |
| 9,726,282 | B2 | 8/2017 | Pohl et al. |
| 9,829,103 | B2 | 11/2017 | Volpert |
| 10,183,569 | B2 | 1/2019 | Toyota et al. |
| 10,422,389 | B2 | 9/2019 | Ebihara |
| 10,479,187 | B2 | 11/2019 | Lubben et al. |
| 10,487,918 | B2 | 11/2019 | Turner et al. |
| 10,518,626 | B2 | 12/2019 | Pettersson |
| 10,519,920 | B2 | 12/2019 | Patil et al. |
| 10,591,025 | B2 | 3/2020 | Fliearman et al. |
| 10,619,711 | B2 | 4/2020 | Fliearman et al. |
| 2001/0019210 | A1 | 9/2001 | Fukasaku et al. |
| 2001/0025621 | A1 | 10/2001 | Shiraishi et al. |
| 2001/0042649 | A1 | 11/2001 | Maeda et al. |
| 2002/0019284 | A1 | 2/2002 | Aikawa et al. |
| 2002/0033059 | A1 | 3/2002 | Pels et al. |
| 2002/0117860 | A1 | 8/2002 | Man et al. |
| 2002/0139592 | A1 | 10/2002 | Fukasaku et al. |
| 2002/0177504 | A1 | 11/2002 | Pels |
| 2003/0001391 | A1 | 1/2003 | Kuang et al. |
| 2003/0104900 | A1 | 6/2003 | Takahashi |
| 2003/0224888 | A1 | 12/2003 | Wilder et al. |
| 2004/0055800 | A1 | 3/2004 | Katou et al. |
| 2004/0116226 | A1 | 6/2004 | Baker et al. |
| 2006/0111211 | A1 | 5/2006 | Kefti-Cherif et al. |
| 2006/0166777 | A1 | 7/2006 | Aikawa et al. |
| 2007/0108006 | A1 | 5/2007 | Schmid et al. |
| 2007/0157899 | A1 | 7/2007 | Seufert et al. |
| 2007/0265126 | A1 | 11/2007 | Janson et al. |
| 2008/0179119 | A1 | 7/2008 | Grenn et al. |
| 2008/0314195 | A1 | 12/2008 | Andoh et al. |
| 2009/0055061 | A1 | 2/2009 | Zhu |
| 2009/0176611 | A1 | 7/2009 | Avery |
| 2009/0264241 | A1 | 10/2009 | Dittrich et al. |
| 2009/0312145 | A1 | 12/2009 | Pohl et al. |
| 2010/0029428 | A1 | 2/2010 | Abe et al. |
| 2010/0044183 | A1 | 2/2010 | Guggolz et al. |
| 2010/0048338 | A1 | 2/2010 | Si |
| 2010/0063704 | A1 | 3/2010 | Okubo et al. |
| 2010/0076634 | A1 | 3/2010 | Brigham |
| 2010/0190602 | A1* | 7/2010 | Wittkopp ................. F16H 3/66 475/303 |
| 2010/0234166 | A1* | 9/2010 | Sarnie ..................... F16H 3/666 475/285 |
| 2011/0010031 | A1 | 1/2011 | Syed et al. |
| 2011/0015020 | A1 | 1/2011 | Grosser |
| 2011/0053729 | A1 | 3/2011 | Parsons et al. |
| 2011/0070999 | A1 | 3/2011 | Soliman et al. |
| 2011/0263379 | A1 | 10/2011 | Liang et al. |
| 2012/0103293 | A1 | 5/2012 | Robinette et al. |
| 2012/0165156 | A1* | 6/2012 | Oguri ..................... F16H 3/666 477/111 |
| 2012/0235473 | A1 | 9/2012 | Jiang et al. |
| 2012/0240723 | A1 | 9/2012 | Gluckler et al. |
| 2012/0316026 | A1* | 12/2012 | Oguri ..................... F16H 3/663 475/284 |
| 2013/0046427 | A1 | 2/2013 | Hohenberg |
| 2013/0252773 | A1 | 9/2013 | Suntharalingam et al. |
| 2013/0316873 | A1 | 11/2013 | Jansen et al. |
| 2014/0011619 | A1 | 1/2014 | Pohl et al. |
| 2014/0128205 | A1* | 5/2014 | Phillips ..................... F16H 3/46 475/303 |
| 2014/0137824 | A1 | 5/2014 | Jacques et al. |
| 2014/0150604 | A1 | 6/2014 | Kaltenbach |
| 2014/0256490 | A1 | 9/2014 | Honda |
| 2015/0226323 | A1 | 8/2015 | Pohl et al. |
| 2015/0239335 | A1 | 8/2015 | Wachter et al. |
| 2016/0031438 | A1 | 2/2016 | Matsui et al. |
| 2016/0031439 | A1 | 2/2016 | Nefcy et al. |
| 2016/0052382 | A1 | 2/2016 | Clark et al. |
| 2016/0076629 | A1 | 3/2016 | Modrzejewski et al. |
| 2016/0082821 | A1 | 3/2016 | Mueller et al. |
| 2016/0096522 | A1 | 4/2016 | Ortmann et al. |
| 2016/0137045 | A1 | 5/2016 | Zhu et al. |
| 2016/0200311 | A1 | 7/2016 | Nefcy et al. |
| 2016/0207525 | A1 | 7/2016 | Nefcy et al. |
| 2016/0258495 | A1 | 9/2016 | Bird |
| 2016/0288780 | A1 | 10/2016 | Shukla et al. |
| 2016/0348741 | A1 | 12/2016 | Niemiec et al. |
| 2017/0248196 | A1 | 8/2017 | Turner et al. |
| 2017/0328470 | A1 | 11/2017 | Pohl et al. |
| 2017/0368925 | A1 | 12/2017 | Maki |
| 2018/0100564 | A1 | 4/2018 | Fliearman et al. |
| 2018/0106365 | A1 | 4/2018 | Tsukizaki et al. |
| 2018/0172124 | A1 | 6/2018 | Valente et al. |
| 2018/0186230 | A1 | 7/2018 | Fukuda et al. |
| 2018/0236864 | A1 | 8/2018 | Imamura et al. |
| 2018/0238443 | A1 | 8/2018 | Aulin et al. |
| 2018/0244145 | A1 | 8/2018 | Ohnemus et al. |
| 2018/0298993 | A1 | 10/2018 | Fliearman et al. |
| 2019/0084555 | A1 | 3/2019 | Omura et al. |
| 2019/0160936 | A1 | 5/2019 | Lubben et al. |
| 2019/0176806 | A1 | 6/2019 | Trent |

(56) References Cited

U.S. PATENT DOCUMENTS

| | | | |
|---|---|---|---|
| 2019/0219022 A1 | 7/2019 | Patil et al. | |
| 2019/0344655 A1 | 11/2019 | Pettersson | |
| 2019/0351751 A1 | 11/2019 | Sato et al. | |

FOREIGN PATENT DOCUMENTS

| | | | |
|---|---|---|---|
| DE | 000019927521 A1 | 6/2000 | |
| DE | 000019911924 A1 | 9/2000 | |
| DE | 000019923316 A1 | 11/2000 | |
| DE | 10003741 A1 | 4/2001 | |
| DE | 010007959 A1 | 8/2001 | |
| DE | 10103726 A1 | 8/2002 | |
| DE | 102006037576 A1 | 4/2008 | |
| DE | 102010030570 A1 | 12/2011 | |
| DE | 102010030571 A1 | 12/2011 | |
| DE | 102010060140 A1 | 4/2012 | |
| DE | 102011080068 A1 | 1/2013 | |
| DE | 102011089708 A1 | 6/2013 | |
| DE | 102011089709 A1 | 6/2013 | |
| DE | 102011089710 A1 | 6/2013 | |
| DE | 112011103973 T5 | 10/2013 | |
| DE | 102008045202 A1 | 3/2014 | |
| DE | 102013203009 A1 | 8/2014 | |
| DE | 102013012747 A1 | 9/2014 | |
| DE | 102013206970 A1 | 10/2014 | |
| DE | 102014200720 A1 | 2/2015 | |
| DE | 102014200723 B3 | 2/2015 | |
| DE | 102013219948 | 4/2015 | |
| DE | 102017203026 A1 | 8/2017 | |
| DE | 102017204269 A1 | 9/2017 | |
| DE | 102020204705 A1 | 10/2020 | |
| DE | 102020204795 A1 | 10/2020 | |
| EP | 0384808 A1 | 9/1991 | |
| EP | 0645271 B1 | 3/1995 | |
| EP | 0391386 B1 | 9/1995 | |
| EP | 000002272702 A2 | 1/2011 | |
| EP | 2664785 | 11/2013 | |
| EP | 000001069310 B4 | 3/2014 | |
| GB | 0650564 | 2/1951 | |
| GB | 2506199 A | 3/2014 | |
| JP | 002015116004 A | 6/2015 | |
| WO | 1999023398 A2 | 5/1999 | |
| WO | 0188369 A1 | 11/2001 | |
| WO | 200700107458 A2 | 9/2007 | |

OTHER PUBLICATIONS

USPTO Non-Final Office Action dated Aug. 24, 2020 for Utility U.S. Appl. No. 16/385,964.
USPTO Non-Final Office Action dated Aug. 24, 2020 for Utility U.S. Appl. No. 16/385,784.
USPTO Non-Final Office Action dated Jun. 19, 2020 for Utility U.S. Appl. No. 16/386,075.
USPTO non-final office action issued in pending Utility U.S. Appl. No. 16/386,052 dated Oct. 30, 2020.
USPTO pending Utility U.S. Appl. No. 16/887,973, filed May 29, 2020.
Deere & Company, Multi-Mode Integrated Starter-Generator Device With Electromagnetic Actuation Assembly, Utility U.S. Appl. No. 16/386,020, filed Apr. 16, 2019.
Deere & Company, Multi-Mode Integrated Starter-Generator Device With Transmission Assembly Mounting Arrangement, Utility U.S. Appl. No. 16/386,052, filed Apr. 16, 2019.
Deere & Company, Multi-Mode Integrated Starter-Generator Device With Solenoid CAM Actuation Apparatus, Utility U.S. Appl. No. 16/386,075, filed Apr. 16, 2019.
Deere & Company, Multi-Mode Integrated Starter-Generator Device With Preloaded Clutch, Utility U.S. Appl. No. 16/385,784, filed Apr. 16, 2019.
Deere & Company, Multi-Mode Integrated Starter-Generator Device, Utility U.S. Appl. No. 16/385,860, filed Apr. 16, 2019.
Deere & Company, Multi-Mode Integrated Starter-Generator Device With Preloaded Clutch, Utility U.S. Appl. No. 16/385,892, filed Apr. 16, 2019.
Deere & Company, Multi-Mode Integrated Starter-Generator Device With Magnetic CAM Assembly, Utility U.S. Appl. No. 16/385,934, filed Apr. 16, 2019.
Deere & Company, Multi-Mode Integrated Starter-Generator Device With CAM Arrangement, Utility U.S. Appl. No. 16/385,964, filed Apr. 16, 2019.
Deere & Company, Multi-Mode Integrated Starter-Generator Device With Dog Clutch Arrangement, Utility U.S. Appl. No. 16/385,989, filed Apr. 16, 2019.
Deere & Company, Multi-Mode Starter-Generator Device Transmission With Single Valve Control, Utility U.S. Appl. No. 16/386,001, filed Apr. 16, 2019.
NTN Automotive Sales Headquarters, Compact Clutch Integrated Pulley for Alternators, NTN Technical Review No. 75, 2007.
Harmonic Drive LLC, Harmonic Planetary Precision Gearing & Motion Control, Product Brochure, Mar. 2006.
Ioan-Adrian Viorel et al., Integrated Starter-Generators for Automotive Applications, Technical University of Cluj-Romania, Dept. of Electrical Machines, vol. 45, No. 3, 2004.
North Atalantic Starter, Starter Drives Explained, Northatian.com, 2005.
German Search Report for application No. 1020172030267 dated Aug. 4, 2017.
German Search Report for application No. 1020182189080 dated May 27, 2019.
German Search Report for application No. 1020182214956 dated May 28, 2019.
German Search Report for application No. 1020182180784 dated Jun. 4, 2019.
USPTO Final Office Action dated Mar. 8, 2019 for Utility U.S. Appl. No. 15/056,767.
USPTO Final Office Action dated Jun. 11, 2018 for Utility U.S. Appl. No. 15/056,767.
USPTO Non-Final Office Action dated Sep. 9, 2019 for Utility U.S. Appl. No. 15/834,358.
USPTO Non-Final Office Action dated Nov. 2, 2017 for Utility U.S. Appl. No. 15/056,767.
USPTO Non-Final Office Action dated Sep. 28, 2018 for Utility U.S. Appl. No. 15/056,767.
USPTO Non-Final Office Action dated Nov. 1, 2018 for Utility U.S. Appl. No. 15/825,520.
USPTO Non-Final Office Action dated Feb. 25, 2019 for Utility U.S. Appl. No. 15/834,356.
USPTO Non-Final Office Action dated Mar. 4, 2020 for Utility U.S. Appl. No. 16/385,934.
Deere & Company, Utility U.S. Appl. No. 16/840,008, filed Apr. 3, 2020.
German Search Report issued in German Application No. 102020204706.5 dated Sep. 3, 2020. (7 pages).
German Search Report issued in German Application No. 102020204795.2 dated Sep. 2, 2020. (7 pages).
German Search Report issued in German Application No. 102020204705.7 dated Sep. 1, 2020. (6 pages).
German Search Report issued in German Application No. 102020204642.5 dated Sep. 4, 2020. (8 pages).
German Search Report issued in German Application No. 102020204943.3 dated Sep. 4, 2020. (7 pages).
German Search Report issued in German Application No. 102020204704.9 dated Sep. 3, 2020. (7 pages).
German Search Report issued in German Application No. 102020203063.4 dated Sep. 4, 2020. (6 pages).
German Search Report issued in German Application No. 102020204646.8 dated Sep. 1, 2020. (6 pages).
German Search Report issued in German Application No. 102021113913.9 dated Sep. 30, 2021. (8 pages).
German Search Report issued in German Application No. 102021113924.4 dated Sep. 30, 2021. (7 pages).

* cited by examiner

WORK VEHICLE MULTI-SPEED DRIVE ASSEMBLY WITH BIFURCATED CLUTCHES

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicle drive systems, including drive assemblies for effecting multi-speed rotational outputs in either clock direction.

BACKGROUND OF THE DISCLOSURE

Work vehicles, such as those used in the agriculture, construction and forestry industries, and other conventional vehicles, may be powered by an internal combustion engine (e.g., a diesel engine) and/or one or more electric power sources (e.g., electric motors). Various drive arrangements may be employed in the vehicle to effect power transfer from the prime or secondary power sources. For example, the vehicle power and drive line may include one or more drive assemblies to effect one or more output speeds for operating certain vehicle components. For example, wheel end drives, final drives and the like may provide one or more gear ratios to transfer terminal or near terminal power to the tractive ground-engaging wheels or tracks of the vehicle. Efficient and smooth operation through the speed and torque ranges required of such drives is desirable.

SUMMARY OF THE DISCLOSURE

This disclosure provides a multi-speed drive assembly such as may be used in work vehicles (e.g., as tractive wheel drives).

In one aspect, the disclosure provides a drive assembly for a work vehicle with a drive housing including a first housing element forming a reaction member; a drive shaft rotatable about a drive axis relative to the reaction member in a first rotation direction and alternatively a second rotation direction; a planetary gear set coupled to the drive shaft and configured to selectively rotate an output element in the first rotation direction and in the second rotation direction; a first clutch arrangement coupled to the reaction member and including a first clutch ring and a second clutch ring; a second clutch arrangement to interface with the planetary gear set to selectively effect a second rotation speed of the output element in the first rotation direction and in the second rotation direction; at least one first actuator configured to effect movement of the first clutch arrangement along the drive axis to selectively engage the planetary gear set; and at least one second actuator configured to effect movement of the second clutch arrangement along the drive axis to selectively engage the planetary gear set. The first clutch ring of the first clutch arrangement is configured to interface the planetary gear set with the reaction member to effect a first rotation speed of the output element in the second rotation direction and the second clutch ring of the first clutch arrangement is configured to interface the planetary gear set with the reaction member to effect the first rotation speed of the output element in the first rotation direction.

In another aspect, the disclosure provides a drive assembly for a work vehicle includes a drive housing with a first housing element forming a stationary reaction member; a drive shaft rotatable about a drive axis relative to the stationary reaction member in a first rotation direction and alternatively a second rotation direction; a planetary gear set coupled to the drive shaft and configured to selectively rotate an output element in the first rotation direction and in the second rotation direction; a high clutch arrangement to interface with the planetary gear set to selectively effect a second rotation speed of the output element in the first rotation direction and in the second rotation direction; at least one low actuator configured to effect movement of the low clutch arrangement along the drive axis to selectively engage the planetary gear set; and at least one high actuator configured to effect movement of the high clutch arrangement along the drive axis to selectively engage the planetary gear set. The planetary gear set includes a first-stage sun gear coupled to the drive shaft; a first-stage carrier; a set of first-stage planet gears supported by the first-stage carrier and engaging the first-stage sun gear; a second-stage sun gear coupled to the first-stage carrier; a second-stage carrier; a set of second-stage planet gears supported by the second-stage carrier and engaging the second-stage sun gear; and a ring gear coupled to the output element and engaging the set of first-stage planet gears and the set of second-stage planet gears. The first clutch ring of the low clutch arrangement is configured to interface the planetary gear set with the stationary reaction member to effect a first rotation speed of the output element in the second rotation direction and the second clutch ring of the low clutch arrangement is configured to interface the planetary gear set with the stationary reaction member to effect the first rotation speed of the output element in the first rotation direction.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
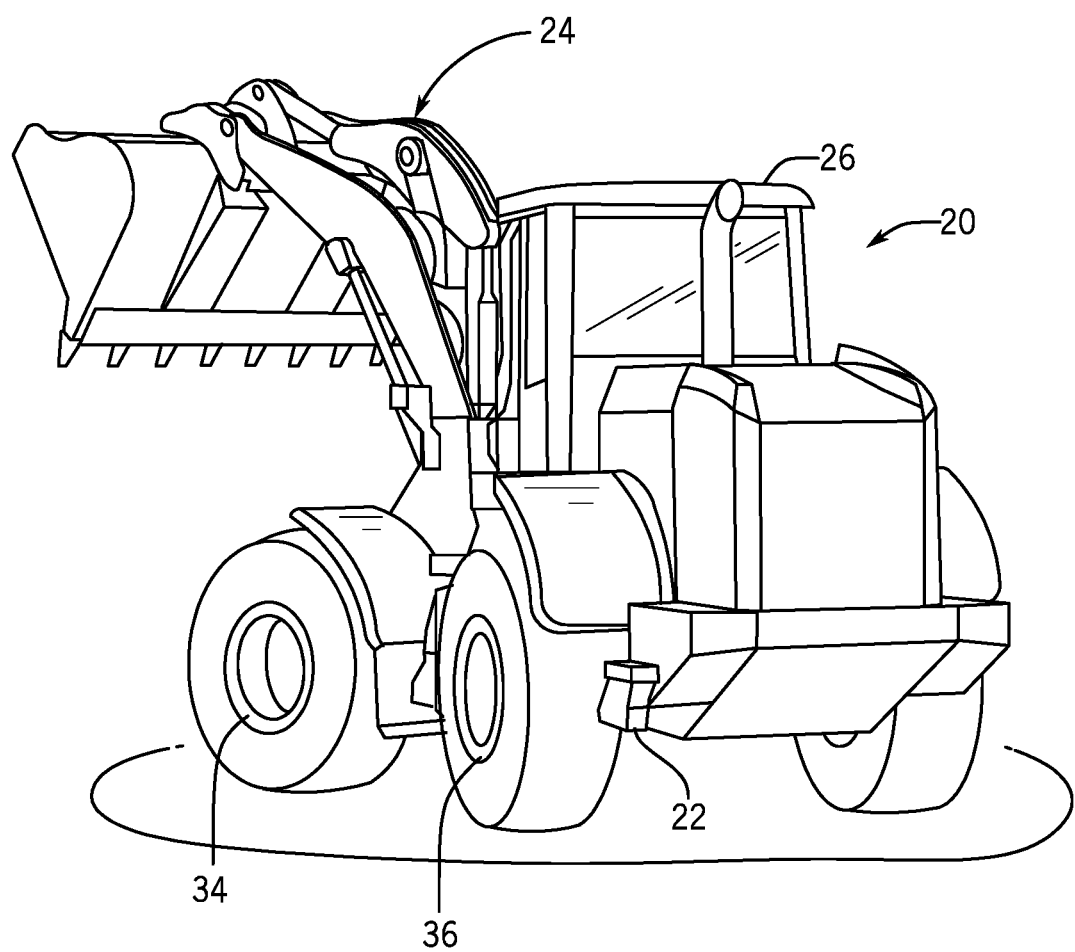
FIG. 1 is a schematic side view of an example work vehicle in the form of a wheel loader in which the disclosed drive assembly may be employed.

The following describes one or more example embodiments of the disclosed bi-directional drive assembly, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term "axial" refers to a dimension that is generally parallel to an axis of rotation, axis of symmetry, or centerline of a component or components. For example, in a cylinder or disc with a centerline and opposite, generally circular ends or faces, the "axial" dimension may refer to the dimension that generally extends in parallel to the centerline between the opposite ends or faces. In certain instances, the term "axial" may be utilized with respect to components that are not cylindrical (or otherwise radially symmetric). For example, the "axial" dimension for a rectangular housing containing a rotating shaft may be viewed as a dimension that is generally in parallel with the rotational axis of the shaft. Furthermore, the term "radially" as used herein may refer to a dimension or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial dimension. Additionally, the term "circumferential" may refer to a collective tangential dimension that is perpendicular to the radial and axial dimensions about an axis.

Generally, the disclosure provides a drive assembly that is selectively or alternatively operable in either rotational clock direction at the input and output sides of the drive assembly. Without changing internal or external components, the drive assembly may receive rotational input power and transmit rotational output power in either clock direction, as desired, using the drive signal to the power source (e.g., electric machine) to control output rotation direction. Multiple such drive assemblies with common internal and external hardware may thus be employed for oppositely facing shafts that are required to rotate in opposite clock directions to collectively effect one motion of the vehicle or subsystem thereof, such as to provide a tractive force in opposite clock directions to ground-engaging wheels or tracks at opposite sides of the vehicle to collectively propel the vehicle either in a forward or the rearward travel direction. In one example implementation, the bi-directional drive assembly may be employed in a common configuration for wheel end drive units for all wheels of the vehicle.

In certain embodiments, the drive assembly is or includes a power transmission assembly with a gear set that is driven by a power source, such as one or more electric machines or hydraulic motors. The gear set transmits rotational power from the power source to a rotating output member. The output member may be an intermediate component or tied directly to the driven component. The gear set may effect a ratio change between the input power source and the output member, directly transmit the power without a change in ratio, or a combination thereof. The output member may thus rotate at the same speed as, or one or more different speeds than, the input power source or input shaft. The gear set may take any of various forms including arrangements with enmeshing spur or other gears as well as arrangements with one or more planetary gear sets. Large gear reduction ratios may be achieved by the drive assembly such that a single electric machine or hydraulic motor may be used and operated at suitable speeds for one or more speed and torque outputs. However, multiple electric machines or hydraulic motors may power the drive assembly.

Further, in certain embodiments, the drive assembly may automatically and/or selectively shift gear ratios (i.e., shift between power flow paths having different gear ratios). The drive assembly may include one or more active engagement components that engage or disengage to effect power transmission through a power flow path. In this manner, clutch configurations may be employed to carry out the ratio changes with appropriate control hardware and logic. In various embodiments, the clutch arrangements may have one or more positive interlocking shifting type clutches, possibly referred to as "dog" clutches, in which raised features (e.g., axially extending projections) of the clutches engage and disengage corresponding raised features or move into and out of corresponding recesses in mating components of the gear set. In the case of male/female mating features, a reverse relationship may exist (e.g., the clutches define the recesses receiving raised projections of the gear set). Moreover, one or more clutches may serve to engage and disengage interlocking features of two or more components of a planetary gear set, such that one or more clutch components do not have interlocking features themselves.

In certain embodiments, the drive assembly may include clutch arrangements with multiple clutches (or clutch rings) that selectively interface with a stationary reaction member or the drive assembly (e.g., a component fixed relative to or a part of a drive housing thereof). Selective engagement and disengagement of the clutch arrangements with a planetary gear set grounds one or more components thereof to effect one or more gear ratios and corresponding output rotation speeds and torques. The clutch arrangements may be permanently coupled to the reaction member such that actuating components may be fixedly mounted to the drive assembly without the need for actuation of moving gear set components and the corresponding service lines (e.g., hydraulic passages or lines). Actuation components may also be mounted fixed relative to the reaction member to further reduce or eliminate service lines to non-stationary components. Selective engagement of the multiple clutch elements by the actuation components thereby allows the drive assembly to output multiple output speeds and torques.

In one example, the clutch arrangements include first, second, and third clutch arrangements selectively actuated to engage a planetary gear set. Engagement of the first clutch arrangement grounds a component of the planetary gear set to effect a first gear ratio and output rotation speed and torque; engagement of the second clutch arrangement grounds another component of the planetary gear set to effect a second gear ratio and output rotation speed and torque; and engagement of the third clutch arrangement rotationally fixe components of the planetary gear set to effect a third gear ratio and output rotation speed and torque. Such a multi-speed drive assembly may thus effect three speeds by selectively grounding or fixing different components of the planetary gear set. In that case, the third rotation speed of an output element may be greater than the second rotation speed of the output element which may be greater than the first rotation speed of the output element. In one or more implementations, one of the rotation speeds of the output element (e.g., the third rotation speed) may match the rotation speed and direction of the drive shaft, thereby providing a direct drive mode with a 1:1 gear ratio.

In one or more further examples, the planetary gear set may be a compound planetary gear set including two stages having a first-stage sun gear coupled to the drive shaft, a first-stage carrier, a second-stage sun gear coupled to the first-stage carrier, a second-stage carrier, and a ring gear coupled to an output element. The first clutch arrangement may engage the second-stage carrier to interface with the reaction member to effect the first rotation speed of the output element in the second rotation direction. The second clutch arrangement may engage the second-stage sun gear to interface with the reaction member to effect the second rotation speed of the output element in the second rotation direction. The third clutch arrangement may engage the first-stage sun gear to interface with the output element (e.g., a cover of the planetary gear set), or another member coupled for co-rotation therewith, to effect the third rotation speed of the output element in the first rotation direction.

In certain embodiments, the actuation arrangement includes a number of electromechanical or electromagnetic solenoid actuators (that convert electrical energy into a mechanical linear push and/or pull force) that function to engage and/or disengage the clutch arrangements. In one example, one or more solenoid actuators may be used to reposition each individual clutch ring of a particular clutch arrangement, such that at least two solenoid actuators are used to reposition paired or bifurcated clutch rings of a clutch arrangement. Different types of actuators may be used in combination to reposition one or more clutch rings of the clutch arrangements. Various implementations are encompassed by this disclosure.

As used herein with respect to the solenoid and other type of actuators, the term "activated" or "energized" refers to a command that results in the associated solenoid moving its armature by the application of electromagnetic force. In one example, an energize command for the solenoids results in the respective armatures being pushed out of or pulled into the solenoids, which may occur from applying a current to a coil within the solenoid to push or pull the armature out of/into the solenoid. It is also possible to operate the solenoids by discontinuing current to the coil such that a spring pushes/pulls the armature relative to the solenoid coil.

The drive assembly disclosed herein may be useful for any number of work or conventional vehicle applications. In the work vehicle context, the drive assembly may power various sub-systems including various aspects of the power and drive trains of the vehicle. As one example, the drive assembly may be or be incorporated into a wheel drive for providing tractive power to the ground-engaging wheels or tracks of the vehicle. The drive assembly may be incorporated into the power and drive train at an intermediate location between the wheels/tracks and the prime mover or transmission, or it may be at the wheel/track ends (e.g., one at each ground-engaging wheel or track) in which case the drive assembly may be considered a "final drive" that couples directly or through a downstream gearset to the wheel or track carrying hub. In such a case when the drive assembly is remote from the prime mover, a secondary power source, such as one or more electric machines or hydraulic motors provide the immediate power input to the drive assembly.

The following describes one or more example implementations of the disclosed drive assembly. Discussion herein may sometimes focus on the example application of a wheel end drive assembly of a wheel loader, but the disclosed drive assembly is suitable for other types of components and work vehicles, including various other construction machines (e.g., crawlers, motor graders, dump trucks) as well as various agriculture or forestry machines (e.g., combines, harvesters, balers, mowers, forwarders, forestry skidders and so on) and utility vehicles.

Referring to FIG. 1, in some embodiments, the disclosed work vehicle 20 may be a wheel loader although, as noted, the drive assembly described herein may be applicable to a variety of machines. As shown, the work vehicle 20 may be considered to include a structural main frame or chassis 22 supporting a work implement 24 that is selectively positioned by various combinations of structural elements (e.g., arms, crossbars, pivot joints, etc.) and controllably moved utilizing any number of actuators, such as hydraulic cylinders. The work vehicle 20 may further be considered to include an operator cabin 26, a power and drive train 28, a control system 30, and a hydraulic system 32. The work vehicle 20 may be supported off the ground by ground-engaging wheels or tracks. In the illustrated example, the work vehicle 20 includes a front axle with steerable front wheels 34 (one at each left or right lateral side of the work vehicle 20) and a rear axle with non-steerable rear wheels 36 (one or more at each left or right side of the work vehicle 20).

Figure 2A:
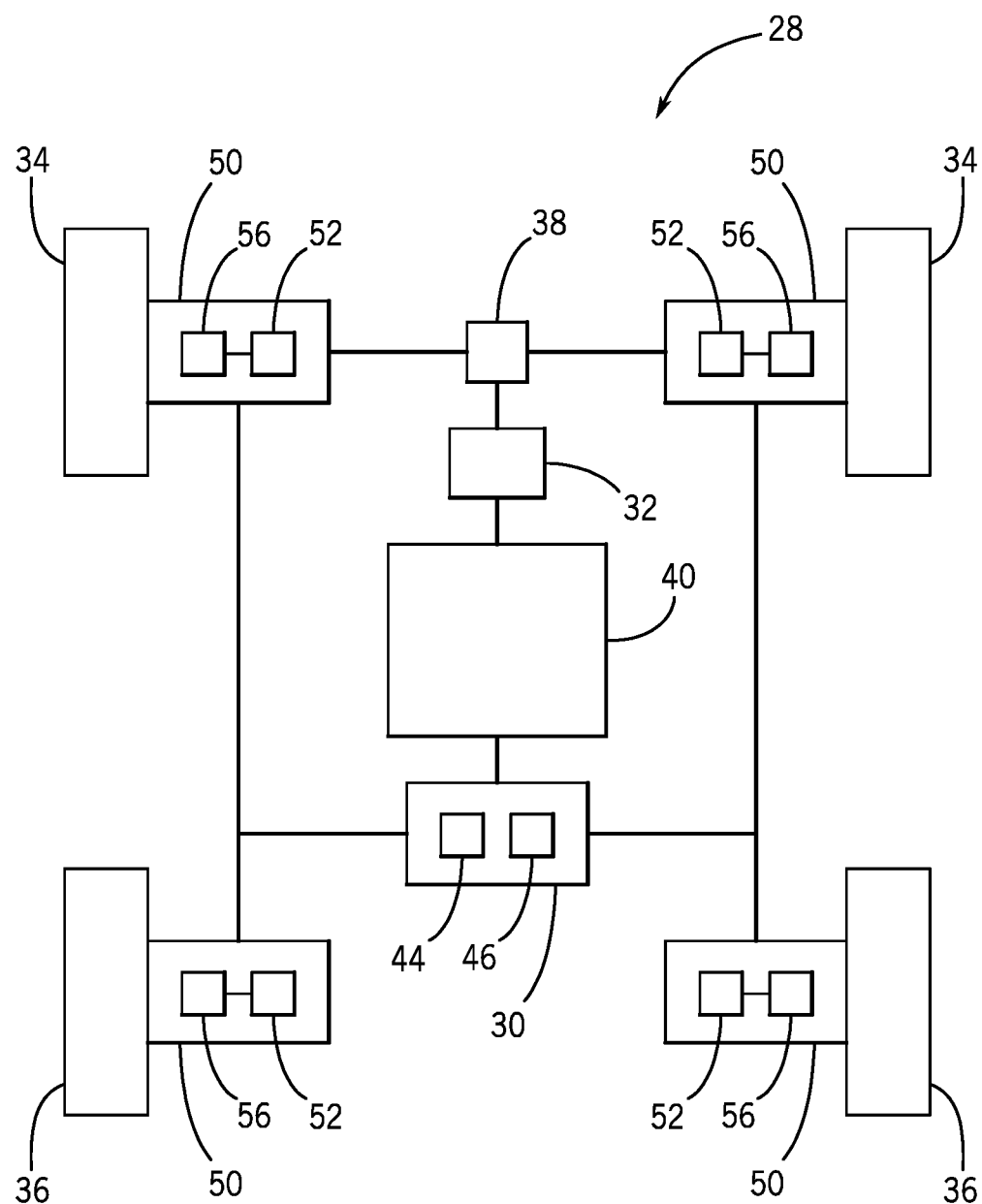
FIG. 2A is a schematic diagram of certain components of a power and drive train for the example work vehicle of FIG. 1.

Referring also to FIG. 2A, the power and drive train 28 has wheel steering components 38, including various devices (e.g., power steering pumps and lines, steering mechanisms, and the like) that couple manual (e.g., operator steering controls or wheel) and/or automated (via the control system 30) steering input to the wheels, such as the steerable wheels 34. The power and drive train 28 includes a prime mover, such as an engine 40, which supplies power to the work vehicle 20, as either direct mechanical power or after being converted to electric or hydraulic power. In one example, the engine 40 is an internal combustion engine, such as a diesel engine, having an engine shaft for outputting mechanical power. The engine 40 is controlled by an engine control module (not shown) of the control system 30. It should be noted that the use of an internal combustion engine is merely an example, as the prime power source may one or more fuel cells, electric motors, hybrid-gas electric motors, or other power-producing devices.

The engine 40 provides power to onboard mechanical, electrical and hydraulic subsystems of the work vehicle 20 governing such things as tractive power to propel the work vehicle 20 and for off-boarding power to other sub-systems remote from the work vehicle 20. For example, the engine 40 may provide mechanical power that is converted to an electric format to run the electronics of the control system 30 and one or more electric drives of the work vehicle 20. The control system 30 thus may have mechanical to electrical power conversion components 44, one or more batteries 46, and associated electronics, including various alternators, generators, voltage regulators, rectifiers, inverters, and the like. The control system 30 may be configured as a computing device or electronic control unit (ECU) with associated processor devices and memory architectures, as a hard-wired computing circuit (or circuits), as a programmable circuit, as a hydraulic, electrical, or electro-hydraulic controller.

The control system 30 may be configured to execute various computational and control functionality with respect to the work vehicle 20, including various devices associated with the power and drive train 28, the hydraulic system 32, and various additional components of the work vehicle 20. In some embodiments, the control system 30 may be configured to receive input signals in various formats (e.g., as hydraulic signals, voltage signals, current signals, and so on), and to output command signals in various formats (e.g., as hydraulic signals, voltage signals, current signals, mechanical movements such as rotation, and so on). The control system 30 is configured to operate various aspects of the disclosed drive assembly, including electromechanical actuators (e.g., solenoids), which may form part of the power and drive train 28 or part of another subsystem of the work vehicle 20.

In some embodiments, the control system 30 may include or be configured to receive input commands from, or otherwise interface with, a human-machine interface or operator interface (not shown) and various sensors, units, and systems onboard or remote from the work vehicle 20. In response, the control system 30 may generate one or more types of commands for implementation by various systems of the work vehicle 20. The control system 30 may additionally or alternatively operate autonomously without input from a human operator, communicating with other systems or devices (including other controllers) in various known ways, including via a CAN bus (not shown), via wireless or hydraulic communication means, or otherwise. In one example and as discussed in greater detail below, the control system 30 may command current to electromagnets associated with an actuator assembly to engage and/or disengage clutches within the drive assembly.

The engine 40 may also provide mechanical power that is converted to hydraulic format to power various hydraulic drives, pumps and compressors that pressurize fluid to drive various actuators of the hydraulic system 32 in order to power components of the work vehicle 20, such as the work implement 24, wheel steering and braking, a tow-behind work implement (not shown), or the like. In this example, the work vehicle 20 supports the mounting of the work implement 24 as a loader with linkage boom arms and a bucket that may be raised and lowered during operation by one or more hydraulic piston-cylinder devices. The hydraulic system 32 may be coupled to and operated by the control system 30 autonomously or in response to commands from an operator input device (e.g., operator controls, operator display device, etc.) in the cabin 26 or remote from the work vehicle 20. The hydraulic system 32 may include other components (e.g., valves, flow lines, pistons/cylinders, seals/gaskets, and so on), such that control of various devices may be effected with, and based upon, hydraulic, mechanical, or other signals and movements.

As noted above, the drive assembly of this disclosure may be implemented in various subsystems within the work vehicle context and may be powered in one or more formats. The following describes one example drive assembly implemented as, and incorporated within, an electric wheel end drive 50. One such wheel end drive 50 is installed just upstream from each of the four wheels 34, 36 of the work vehicle 20. Each wheel end drive 50 itself, or one or more components thereof, may thus be considered a "final" drive due to its location proximate the associated wheel 34, 36 and its functioning to provide the last or nearly last gear ratio for the associated wheel 34, 36. The wheel end drives 50 may differ at each or pairs (e.g., front and rear) of the wheels 34, 36. However, due to the bi-directional functionality of the drive assembly, the wheel end drives 50 are identical for all wheels 34, 36, and as such, only one will be detailed below. Moreover, while the example wheel end drive 50 is electric, it may be operated by a different input power format (e.g., hydraulic or mechanical). The example wheel end drive 50 is also described herein as having multiple (e.g., two) electric machines for input power. However, the wheel end drive 50 may be operated with one or more than two electric machines. In the former case, intermediate input gearing may be utilized or omitted depending on the operating parameters (e.g., speed and torque) of the electric machine and/or the drive assembly itself and the wheels 34, 36. As will be described, intermediate input gearing is used to couple power to the drive assembly when two or more electric machines are employed. Additionally, the example wheel end drive 50 is a multiple-mode drive operable to output multiple speed and torque ranges for tractive power to the wheels 34, 36. Thus, while the engine 40 supplies prime power for the electric machine(s), the wheel end drives 50 are the direct power (and speed and torque) influencers to the wheels 34, 36, such that a central range transmission, axles or other upstream speed- and torque-changing gearing may be, and in the example implementation is, omitted from the work vehicle 20.

Figure 2B:
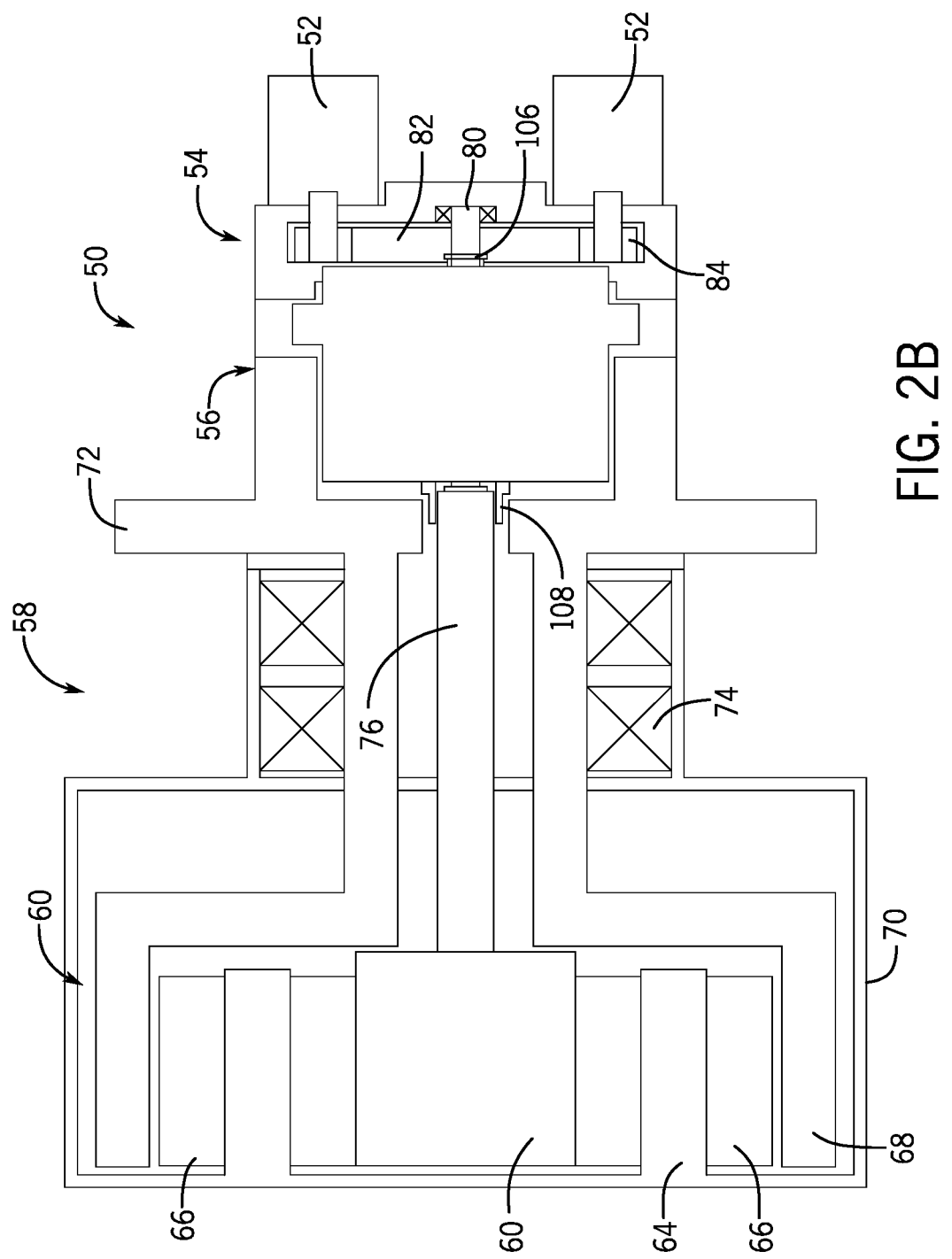
FIG. 2B is a schematic diagram of an example wheel end drive implementation of the disclosed drive assembly that may be incorporated in the example work vehicle of FIG. 1.

Referring also to FIG. 2B, the example wheel end drive 50 includes as principal components the input power sources in the form of two electric machines 52 that couple via an input gear set 54 to a drive assembly 56, which in turns couples to and drives one of the wheels 34, 36 via an outboard wheel end 58. The outboard wheel end 58 may be configured in any way suitable to mount the associated wheel 34, 36. Depending on speed and torque requirements of the wheel end drive 50, the outboard wheel end 58 may contain an outboard gear set, such as a single stage planetary gear set 60 having a sun gear 62 and a carrier 64 that supports planet gears 66 that mesh with a ring gear 68. The carrier 64 may be fixed to a wheel hub (not shown) of the associated wheel 34, 36 directly, or the carrier 64 may be contained within an outboard wheel end housing 70 that couples to the wheel hub. The ring gear 68 may be fixed to or formed integral with a mounting flange 72. The example outboard gear set 60 is a sun-in, carrier out planetary arrangement, although various other configurations are envisioned, including the omission of an outboard gear set or the carrier and/or the outboard wheel end housing 70 being formed by or directly coupled to the wheel hub of the wheel 34, 36. The wheel end drive 50 is assembled to the vehicle chassis 22, such as by the mounting flange 72, in a fixed orientation in the case of the rear wheels 36 or pivotally, about an upright, generally vertical or vertically canted, steering axis (not shown), in the case of the steered front wheels 34. One or more wheel bearings 74 allow the carrier 64 and/or outboard wheel end housing 70 to rotate relative to the vehicle chassis 22 about a generally lateral, or side to side, fixed or pivotal drive or rotation axis. The outboard wheel end 58 rotates about the rotation axis under power output from the drive assembly 56 via output shaft 76 coupled to or formed integrally with the sun gear 62 of the outboard planetary gear set 60. The drive assembly 56 is powered through an input shaft 80 splined to a central input gear 82, which meshes with relatively small diameter shaft gears 84 rotated by the electric machines 52. As noted, the input side of the wheel end drive 50 may be implemented in various ways, including with a different input gear set (e.g., a different axial gear set or a single or double stage planetary gear set), by a single electric machine with or without an input gear set (e.g., direct shaft mounting of the electric machine to the drive assembly), by more than two electric machines with a modified input gear set of any suitable axial, planetary or other gear configuration, and by a power source of a different format (e.g., mechanical or hydraulic). The input side as well as the outboard wheel end 58 of the wheel end drive 50 may be configured as needed to provide a 1:1 or other gear ratio between the electric machines 52 and the drive assembly 56 and between the drive assembly 56 and the wheel hub as needed depending, at least in part, on the desired speed and torque at the wheel 34, 36 and the speed and torque capacity of the electric machines 52.

As described in greater detail below, the drive assembly 56 includes actuators, clutch arrangements and a gear set within a housing. Generally, the drive assembly 56 operates to transfer power (rotational speed and torque) from the electric machines 52 to the outboard wheel end 58 at each wheel 34, 36 at multiple gear ratios that are selected based on the status of the clutch arrangements, which are controlled by the actuators based on signals from the control system 30. In this example, the drive assembly 56 transfers power from an input element 106 coupled to the electric machines 52 to an output element 108 coupled to the outboard wheel end 58, generally along a rotation axis.

Referring now to FIGS. 3-18, the following details the example drive assembly 56 of the wheel end drive 50. The example drive assembly 56 is a three-speed drive including direct or high drive modes in each clock direction, in which 1:1 gear ratios is achieved through which the input and output speeds and torques match, and two other modes in each clock direction in which gear ratios are achieved to effect different output speeds and torques relative to the input power. The example drive assembly 56 effects low, mid and high modes. In each clock direction, the high mode is the direct drive mode and has a higher speed and lower torque than the mid mode, which has a higher speed and lower torque than the low mode.

Figure 3:
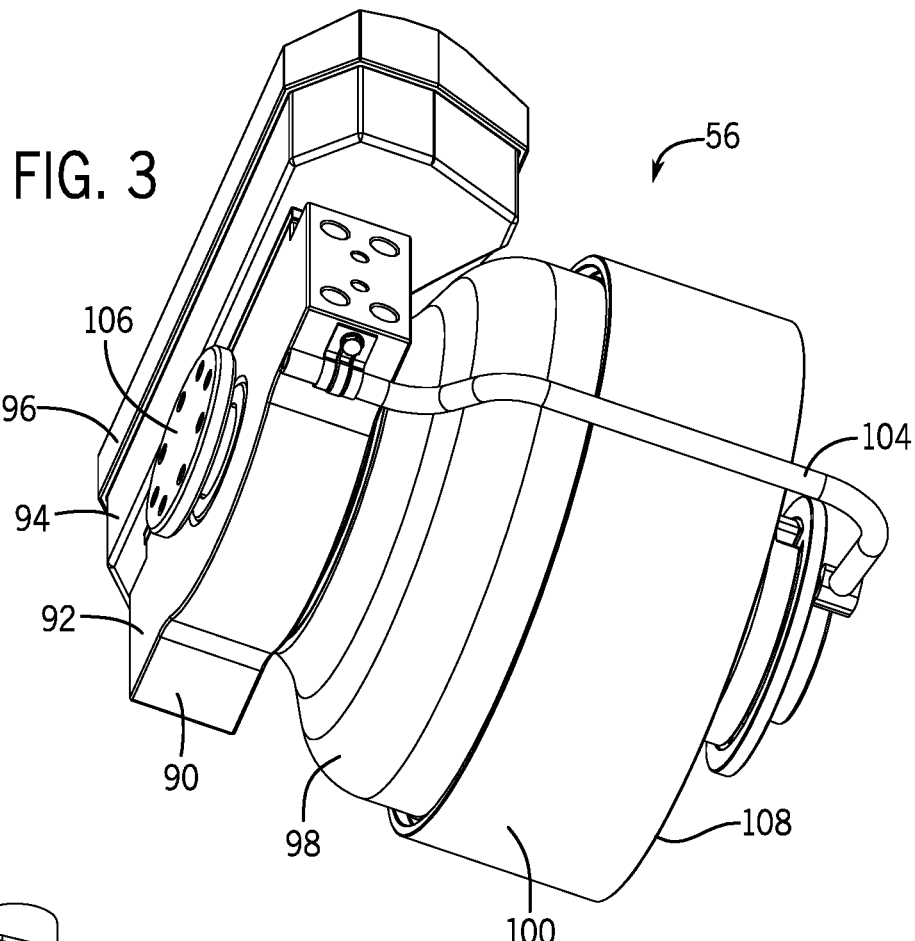
FIG. 3 is a first isometric side view of the drive assembly that may be implemented in the work vehicle of FIG. 1.
Figure 4:
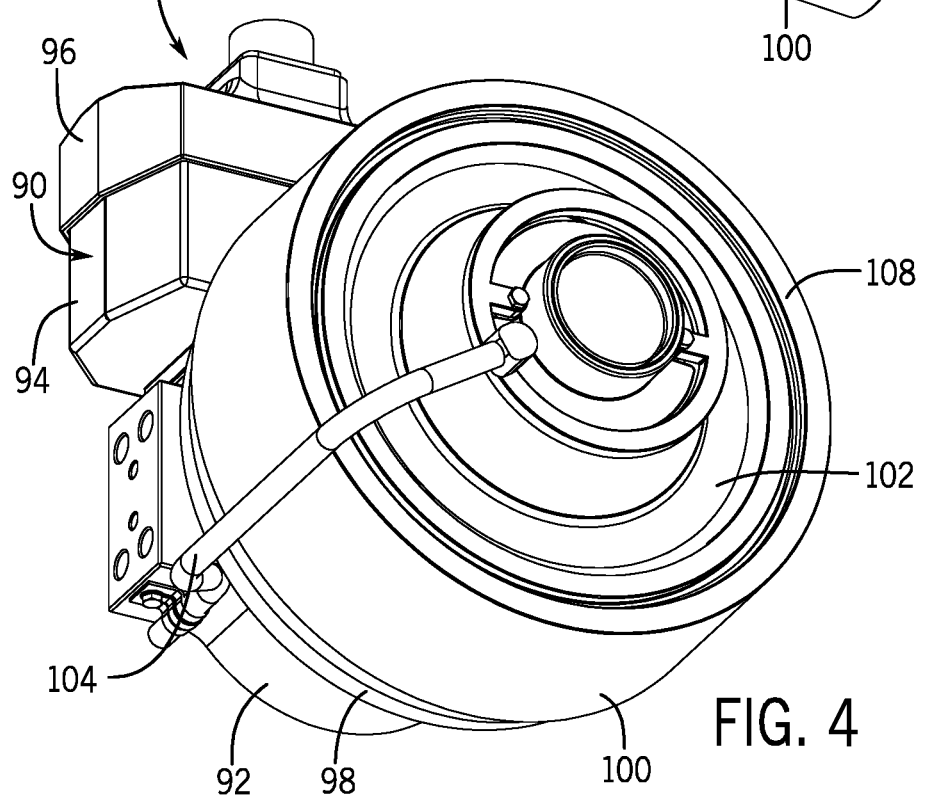
FIG. 4 is a second isometric side view of the drive assembly that may be implemented in the work vehicle of FIG. 1.

Reference is initially made to FIGS. 3 and 4, which are more detailed isometric side views of the drive assembly 56. In the discussion below, relative orientations toward the drive assembly input side, generally depicted by FIG. 3, may be generally considered the first side, and relative orientations toward the drive assembly output side, generally depicted by FIG. 4, may be generally considered a second side.

In one example, the drive assembly 56 generally includes a housing arrangement 90, which is formed by a number of housing elements 92, 94, 96, 98, 100, 102, 104. The housing elements 92, 94, 96, 98, 100, 102, 104, each of which are discussed in greater detail below, may include a first housing element 92 that also functions as a reaction member; second and third housing elements 94, 96 house portions of the drive assembly actuators; a fourth housing element 98 that houses a portion of the clutch arrangements and gear set, a fifth housing element 100 that also houses a portion of the gear set; a sixth housing element 102 that functions as an end plate for the fifth housing element 100 and as a torque transfer element; and a seventh housing element 104 that generally functions as an extended conduit for actuation of one of the actuators. As noted above, the drive assembly 56 may operate to transfer torque between an input element 106 on a relative input side and an output element 108 on a relative output side. In this example, the output element 108 may be considered a hub extending on the housing element 102.

As introduced above, the first housing element 92 functions are a reaction member that is fixed axially and radially with respect to the rotation axis, such that at least in the case of the rear non-steered wheels, the first housing element 92 is fixed relative to the work vehicle chassis 22. As such, the first housing element 92, and certain fixed components, may serve as reaction members against which certain forces effected by non-fixed components of the drive assembly 56 are applied. In the example drive assembly 56, the first housing element 92, or a hub portion thereof (e.g., a stationary spindle), forms a reaction member against which reaction forces from the clutch arrangements apply directly, as detailed below. Thus, the first housing element 92, or hub thereof, itself is considered a "reaction member" as used herein for its direct and indirect backstop of applied forces. Moreover, housing elements 92, 94, 96, 104 are stationary housing elements, and housing elements 98, 100, 102 are rotatable with one or more portions of the gear set, including the output element 108, as discussed in greater detail below.

Additional details regarding the housing arrangement 90 and an introduction of the actuators 120, 124, 130, 134, 140 are provided below with reference to FIGS. 5-9. Generally, the actuators 120, 124, 130, 134, 140 modify the power flow through the drive assembly 56 by repositioning clutch arrangements housed within the housing arrangement 90, described in greater detail below.

Figure 5:
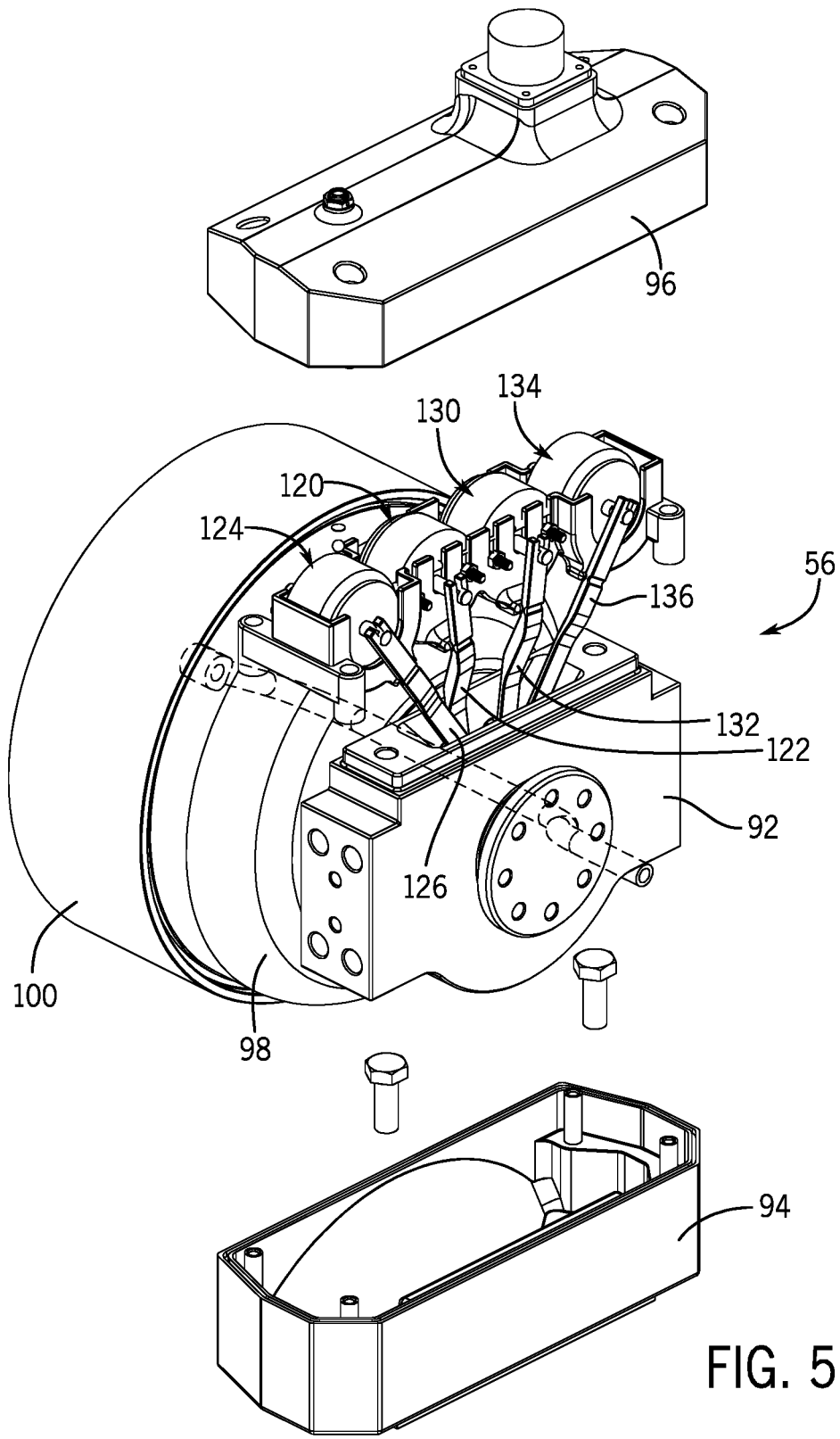
FIG. 5 is a first partial exploded view of the drive assembly of FIGS. 3 and 4.
Figure 7:
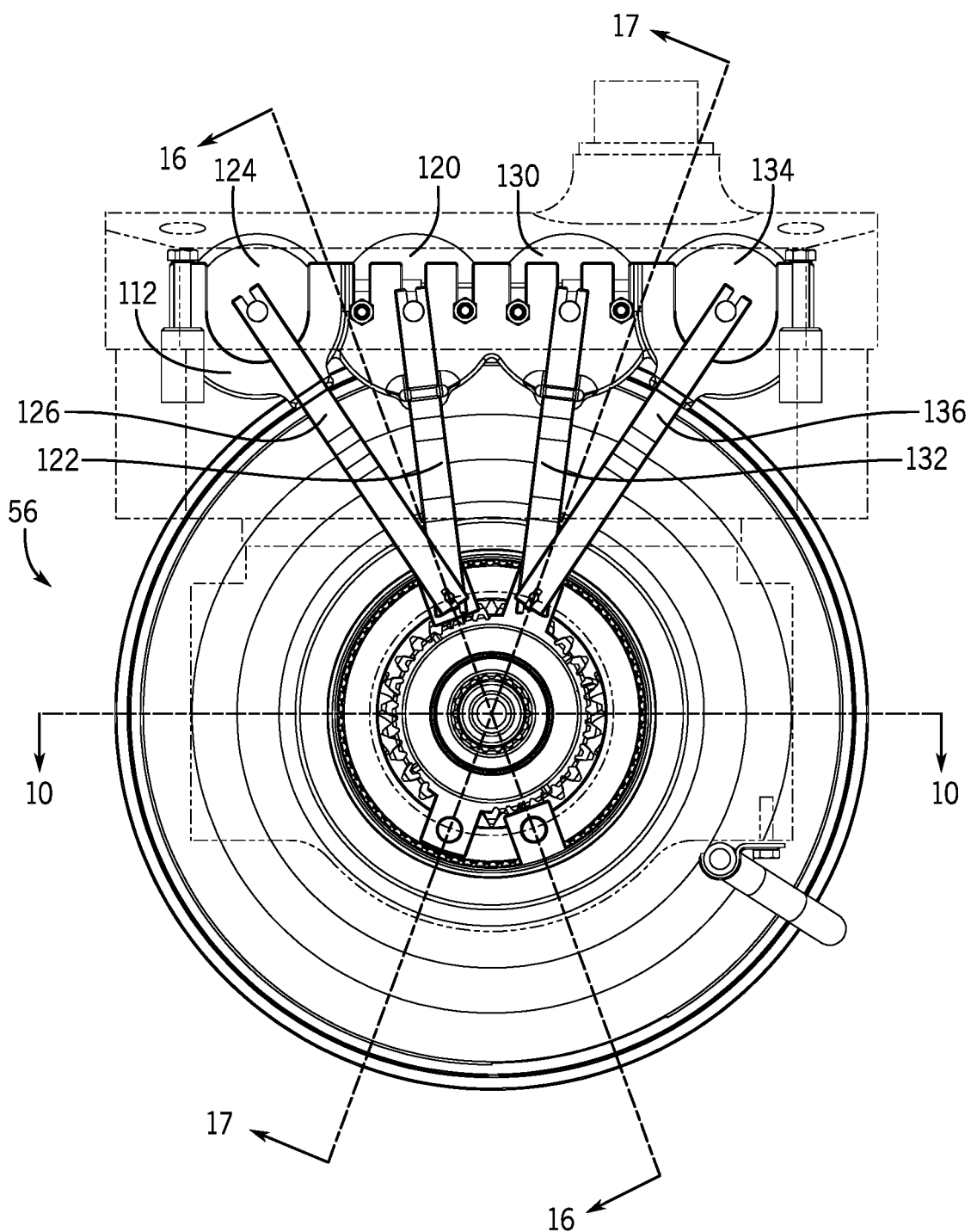
FIG. 7 is a partial first end view of the drive assembly of FIGS. 3 and 4.
Figure 8:
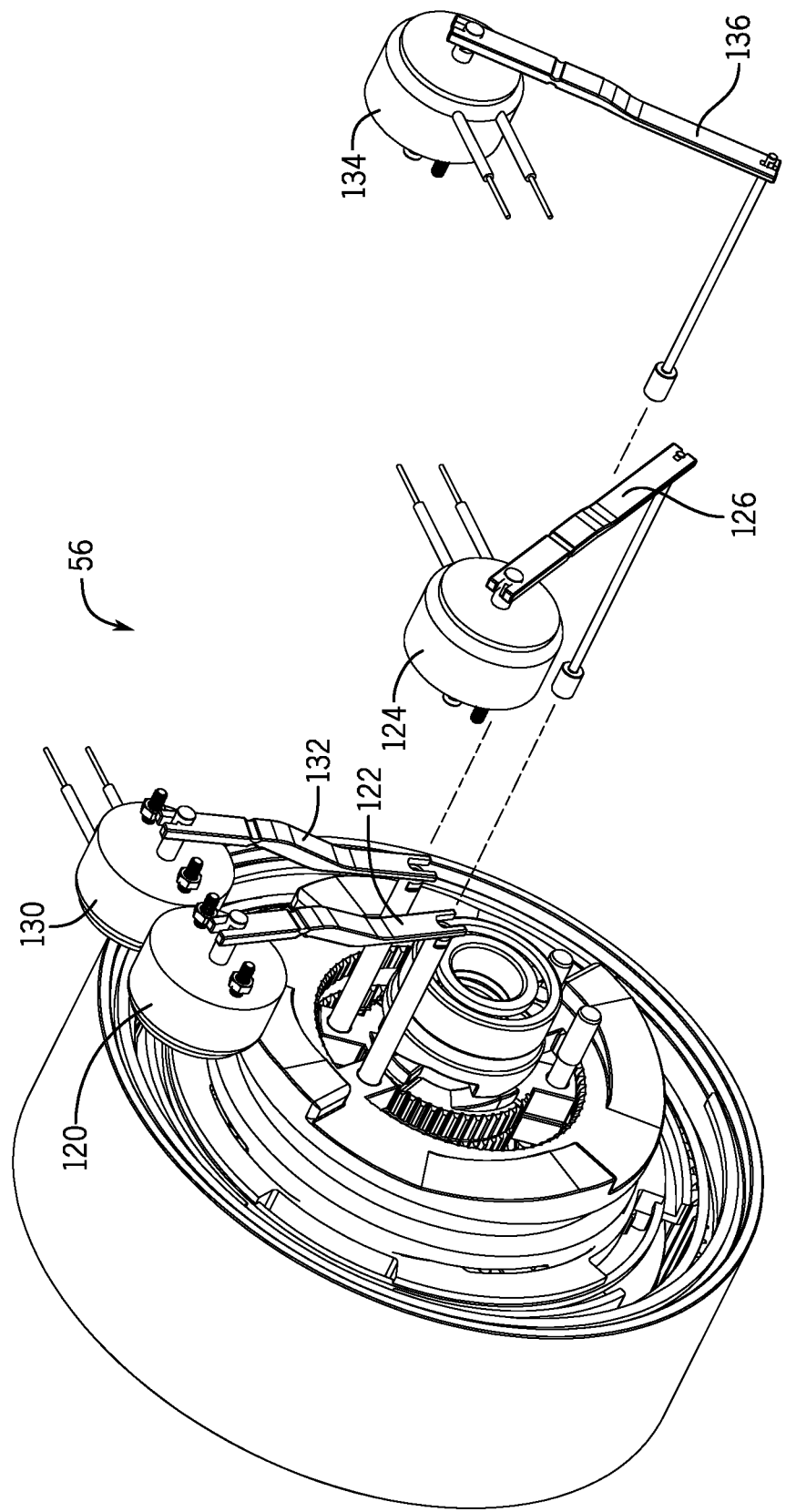
FIG. 8 is a partial exploded isometric end view of the drive assembly of FIGS. 3 and 4.

For example, the view of FIG. 5 is an input side isometric view of the drive assembly 56 with housing elements 94, 96 remove to depict a pair of low actuators 120, 124 and a pair of mid actuators 130, 134. Moreover, the low actuators 120, 124 and mid actuators 130, 134 are further depicted in FIGS. 6 and 8 with input side, partially exploded views and in FIG. 7 with an input side end view, each view having portions of the housing arrangement 90 removed. As best shown by FIGS. 7 and 8, the drive assembly 56 may include a first low actuator 120, a second low actuator 124, a first mid actuator 130, and a second mid actuator 134 supported within the housing arrangement 90 on an actuator frame 112. The actuator frame 112 may be considered a stationary reaction member.

As described in greater detail below, the first low actuator 120 may be coupled to a first portion (e.g., a first low clutch ring) of a low clutch arrangement via a first low actuator linkage 122; and the second low actuator 124 may be coupled to a second portion (e.g., a second low clutch ring) of the low clutch arrangement via a second low actuator linkage 126. Similarly, and as described in greater detail below, the first mid actuator 130 may be coupled to a first portion (e.g., a first mid clutch ring) of a mid clutch arrangement via a first mid actuator linkage 132; and the second mid actuator 134 may be coupled to a second portion (e.g., a second mid clutch ring) of the mid clutch arrangement via a second mid actuator linkage 136. Each actuator and linkage (and associated clutch arrangements) of a pair enable unidirectional operation, and as a pair, enables bi-directional operation.

In this example, each of the actuator linkages 122, 126, 132, 136 is formed by a radial linkage portion (or arm) and an axial linkage portion (or pin). In particular, the radial linkage portion (or arm) of the respective actuator linkage 122, 126, 132, 136 extends from the actuator 120, 124, 130, 134 to a distal end that is coupled to the axial linkage portion of the actuator linkage 122, 126, 132, 136, which in turn extends into the drive assembly 56 to one or more portions of the clutch arrangements, as discussed in greater detail below. In this example, the axial linkage portion of the first low actuator linkage 122 may be hollow and positioned to receive the axial linkage portion of the second low actuator linkage 126; and similarly, the axial linkage portion of the first mid actuator linkage 132 may be hollow and positioned to receive the axial linkage portion of the second mid actuator linkage 136. In this manner, each single pair may effectively occupy the same access positions to the respective clutch arrangement.

Generally, the actuators 120, 124, 130, 134 are electromechanical solenoid devices that generate linear movement at a respective armature by manipulating an induced magnetic field within the solenoid devices. In one example, as the solenoid devices are activated or engaged, the armatures move out of the solenoid devices, although an activated or engaged solenoid devices may also move armatures into the solenoid devices. Further, in this example, actuators 120, 124, 130, 134 may be oriented in different directions such that a single type of solenoid device (e.g., a push solenoid device or a pull solenoid device) may be used in different positions to produce the desired movements within the drive assembly 56. In the discussion below, the term "active" or "engaged" actuator refers to movement of the actuator that results in the engaged position of the respective clutch element (e.g., regardless of whether the respective actuator is pushing, pulling, and/or enabling a spring or other force to engage the clutch element). Although not show, the actuators 120, 124, 130, 134 include at least one connection element that enables wired or wireless commands and/or power with respect to the control system 30 (FIG. 2A) and/or other sources. Other types and arrangements of actuators and linkages may be provided.

Figure 9:
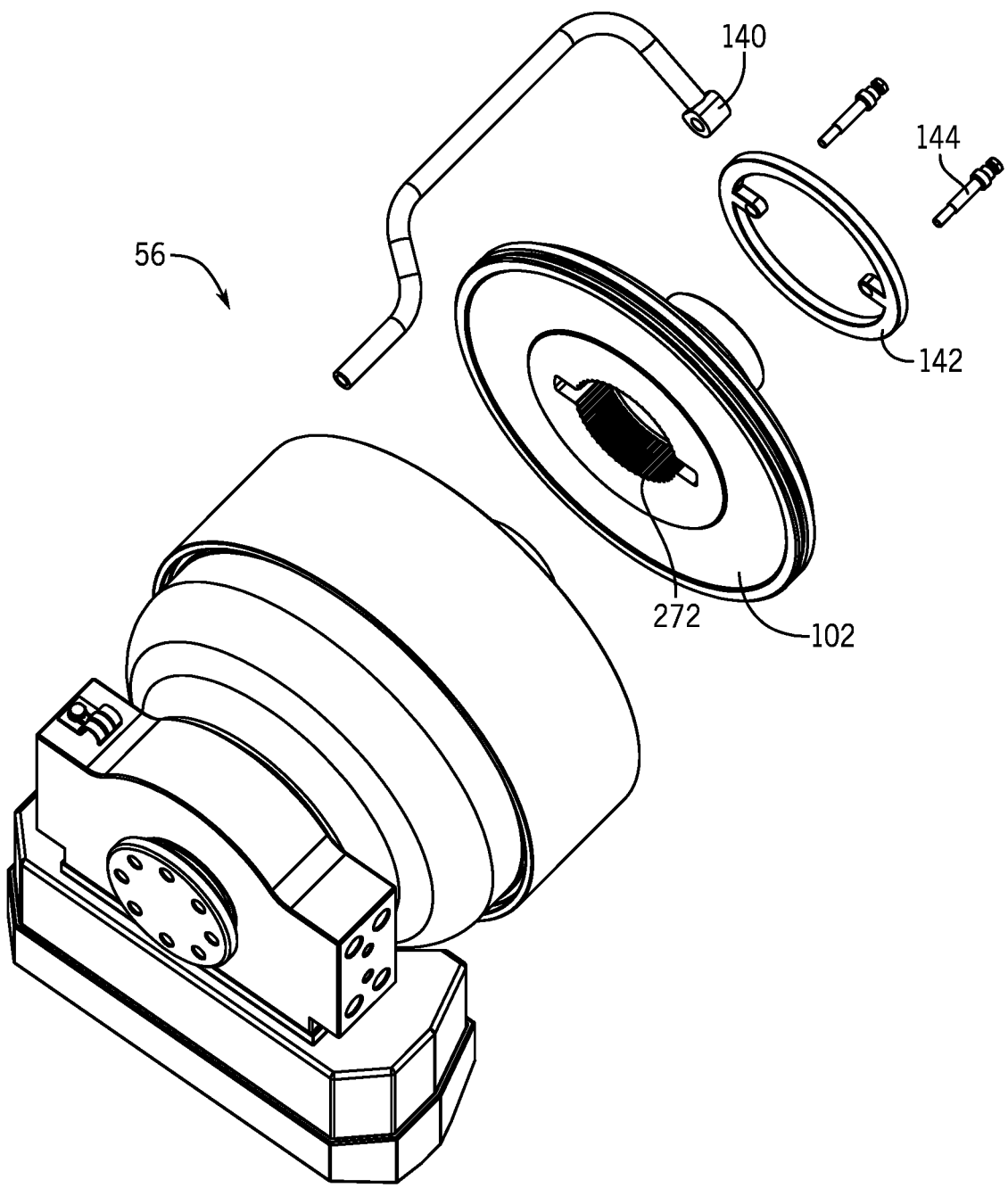
FIG. 9 is a further partial exploded isometric end view of the drive assembly of FIGS. 3 and 4.

As best shown by FIG. 9, the drive assembly 56 further includes a high actuator 140 formed by an electromagnet apparatus positioned proximate to a high actuator ring 142. One or more high actuator linkages 144 extend from the high actuator ring 142, through the ring gear cover 102, to a high clutch arrangement within the drive assembly 56, discussed in greater detail below. In one example, the high actuator 140 is supported on housing element 104 and is configured to be activated and/or deactivated to attract and/or repel the high actuator ring 142, thereby axially repositioning the high actuator ring 142 and high actuator linkages 144, which in turn axially repositions the high clutch arrangement discussed in greater detail below.

Figure 6:
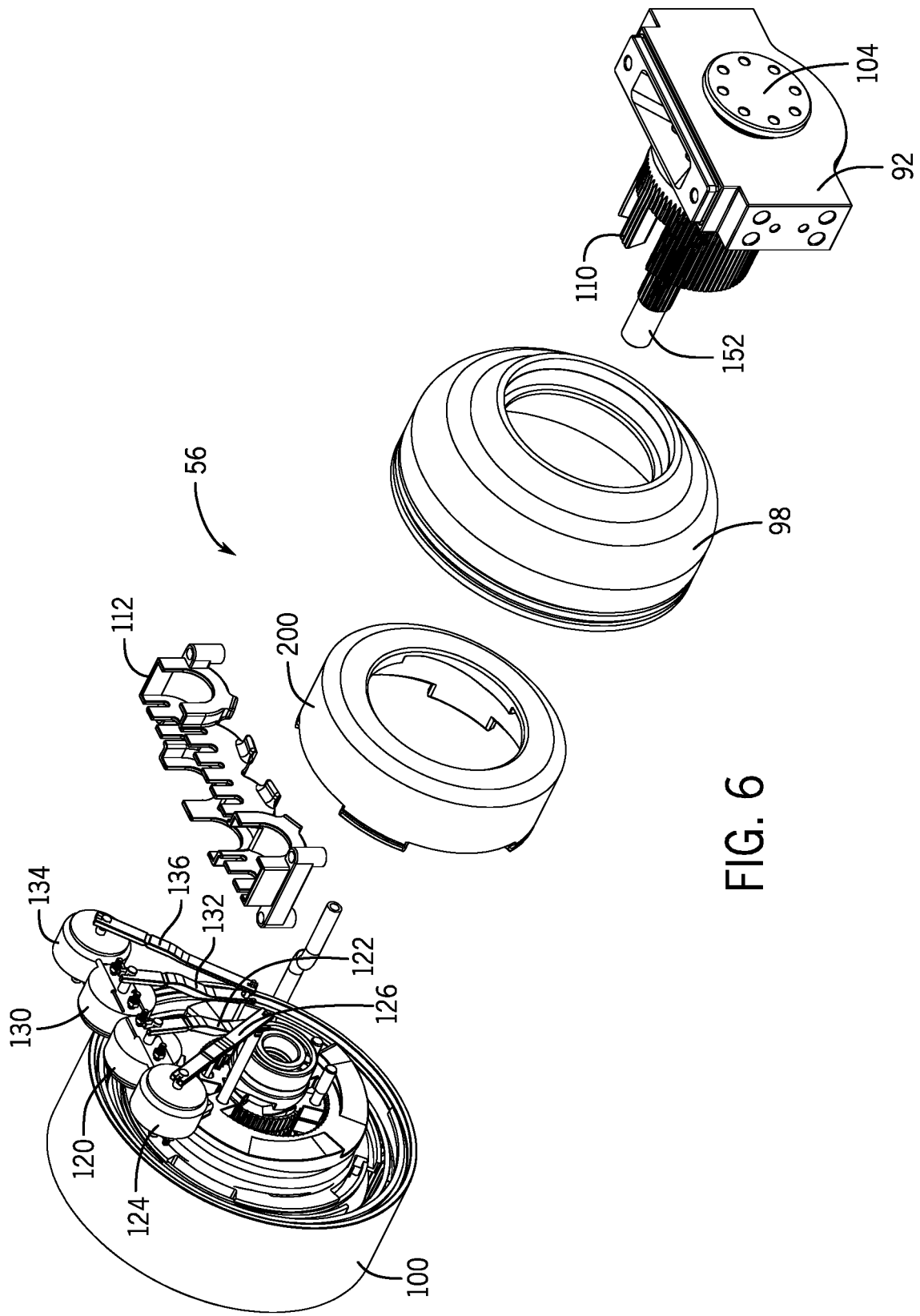
FIG. 6 is a second partial exploded view of the drive assembly of FIGS. 3 and 4.

As introduced above and particularly referencing FIG. 6, the housing arrangement 90 includes the housing element 104 that functions as a reaction member. As best shown by FIG. 6, the housing element 104 includes a stationary spindle 110 that extends into the drive assembly 56, thereby also forming a reaction member that facilitates torque transfer between the input element 106 and the output element 108 and through the drive assembly 56, as discussed in greater detail below.

Figure 10:
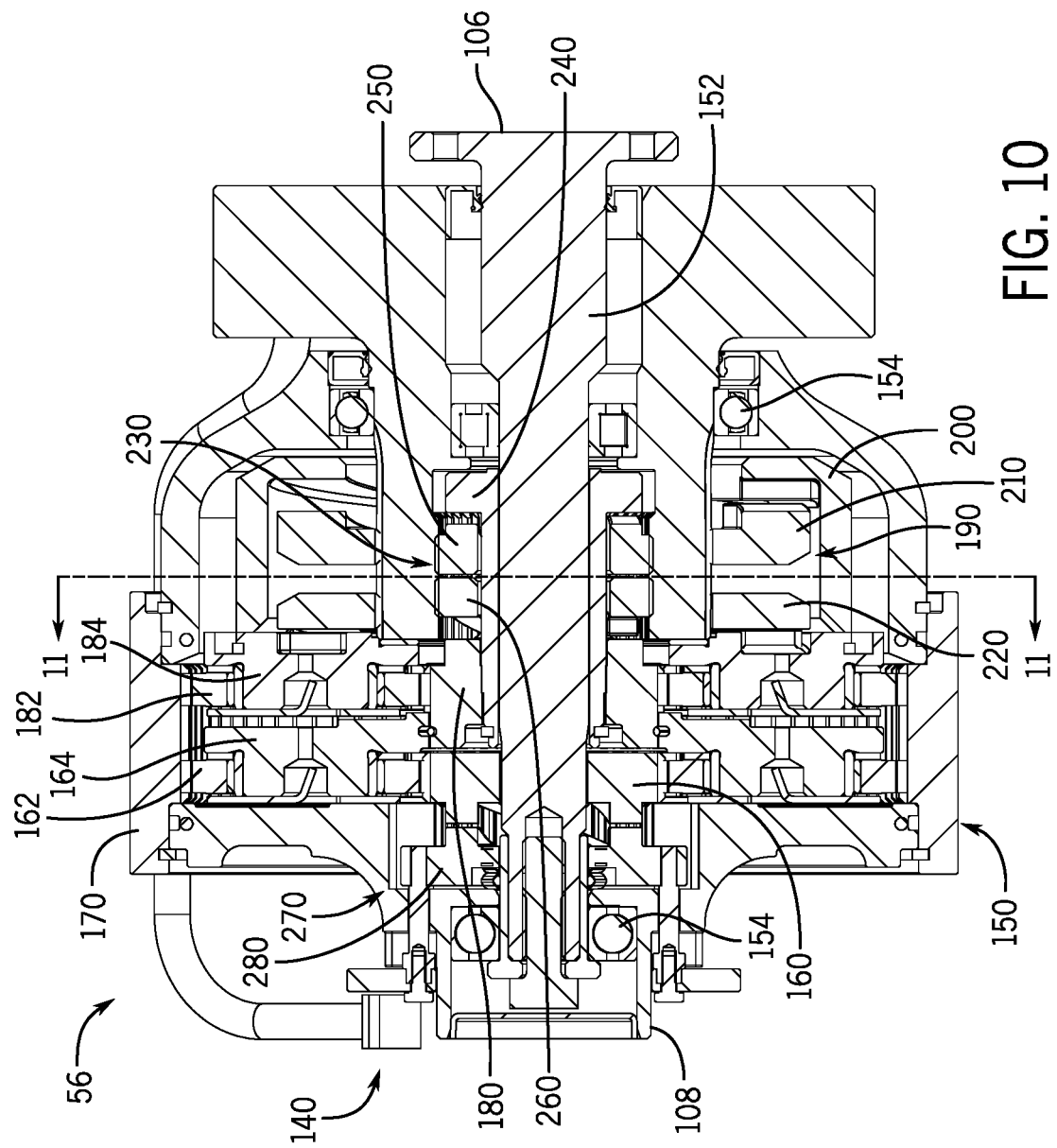
FIG. 10 is a first cross-sectional view of the drive assembly of FIGS. 3 and 4, through line 10-10 of FIG. 7.

Referring now to FIG. 10, the drive assembly 56 includes a gear set 150 and a number of clutch arrangements 190, 230, 270 that enable and modify the transfer of torque between the input element 106 and output element 108 at predetermined gear ratios that are selected based on the status of the clutch arrangements 190, 230, 270. As noted above, the clutch arrangements 190, 230, 270 are controlled by the actuators 120, 124, 130, 134, 140 based on signals from the control system 30 (FIG. 2A). The gear set 150 and clutch arrangements 190, 230, 270 are discussed below.

As shown, the drive assembly 56 includes a drive shaft 152 extending through at least a portion of the interior of the stationary spindle 110 and the gear set 150. The input element 106 of the drive assembly 56 is integral with or otherwise coupled to the drive shaft 152, which in turn is coupled to drive the gear set 150. The drive assembly 56 includes one or more bearing elements 154 that support rotation of the rotatable elements relative to the stationary elements, as well as rotation of rotatable elements relative other rotatable elements (e.g., if a rotatable element is grounded or rotating at different speed).

In this example, the gear set 150 of the drive assembly 56 is a two-stage planetary gear set. In some embodiments, the drive shaft 152 may be considered part of the planetary gear set 150. Although one example configuration of the planetary gear set 150 is described below, other embodiments may have different configurations.

The planetary gear set 150 includes a first-stage sun gear 160 mounted for rotation on the drive shaft 152. The first-stage sun gear 160 includes a plurality of teeth or splines that mesh with a set of first-stage planet gears 162 that circumscribe the first-stage sun gear 160. In one example, the first-stage planet gears 162 include a single circumferential row of one or more planet gears, although other embodiments may include radially stacked rows, each with an odd number of planet gears in the radial direction.

The first-stage planet gears 162 are supported by a first-stage planet carrier 164, which circumscribes the first-stage sun gear 160, as well as the drive shaft 152, and is at least partially formed by first and second radially extending, axially facing carrier plates. The first-stage carrier plates of the first-stage planet carrier 164 include a row of mounting locations for receiving axles extending through and supporting the first-stage planet gears 162 for rotation. As such, in this arrangement, each of the planet axles respectively forms an individual axis of rotation for each of the first-stage planet gears 162, and the first-stage planet carrier 164 enables the set of first-stage planet gears 162 to collectively rotate about the first-stage sun gear 160.

The gear set 150 further includes a ring gear 170 that circumscribes the first-stage sun gear 160 and the first-stage planet gears 162. The ring gear 170 includes radially interior teeth that engage the teeth of the first-stage planet gears 162. As such, first-stage planet gears 162 extend between, and engage with, the first-stage sun gear 160 and the ring gear 170. In some embodiments, a ring gear cover 102 may be mounted within the interior of the ring gear 170 to rotate with the ring gear 170. As introduced above, the sixth housing element 102 functions to at least partially enclose the gear set 150. In particular, the ring gear cover 102 is pressed within the interior of the ring gear 170, and as such, will be referred to as a ring gear cover 102 in the discussion below. As shown, the ring gear 170 is fixedly arranged within the interior of the rotatable gear housing element 100, which as noted above is positioned on bearing elements 154 to rotate relative to the stationary housing element or spindle 110. The ring gear cover 102 forms part of the output element 108 such that the ring gear 170, ring gear cover 102, and the output element 108 rotate as a unit. With respect to the planetary gear set 150, the rotatable ring gear cover 102 and/or ring gear 170 may function as the output element 108 in one or more rotational or clock directions.

The gear set 150 further includes a second-stage sun gear 180 that is generally hollow and cylindrical, extending between first and second ends and circumscribing the drive shaft 152. The first-stage planet carrier 164 has a splined engagement with, or is otherwise fixed to, the second-stage sun gear 180. Additionally, the second-stage sun gear 180 may include a series of splines that mesh with a set of second-stage planet gears 182. The second-stage planet gears 182 are supported by a second-stage planet carrier 184 formed by first and second planet carrier plates. The second-stage planet gears 182 are positioned to additionally engage with the ring gear 170. The second-stage planet gears 182 each have an axle that extends between the two carrier plates that enable each planet gear 182 to rotate relative to the planet carrier 184 about the respective axle. As such, the second-stage planet gears 182 are positioned in between, and engage with each of, the second-stage sun gear 180 and the ring gear 170. Each second-stage planet gear 182 has the same or a different number of teeth relative to a corresponding first-stage planet gear 162.

As noted above, power flow through the gear set 150 is modified based on adjustments of first, second, and third clutch arrangement 190, 230, 270, which may be referenced below as a low clutch arrangement 190, a mid clutch arrangement 230, and a high clutch arrangement 270.

Figure 13:
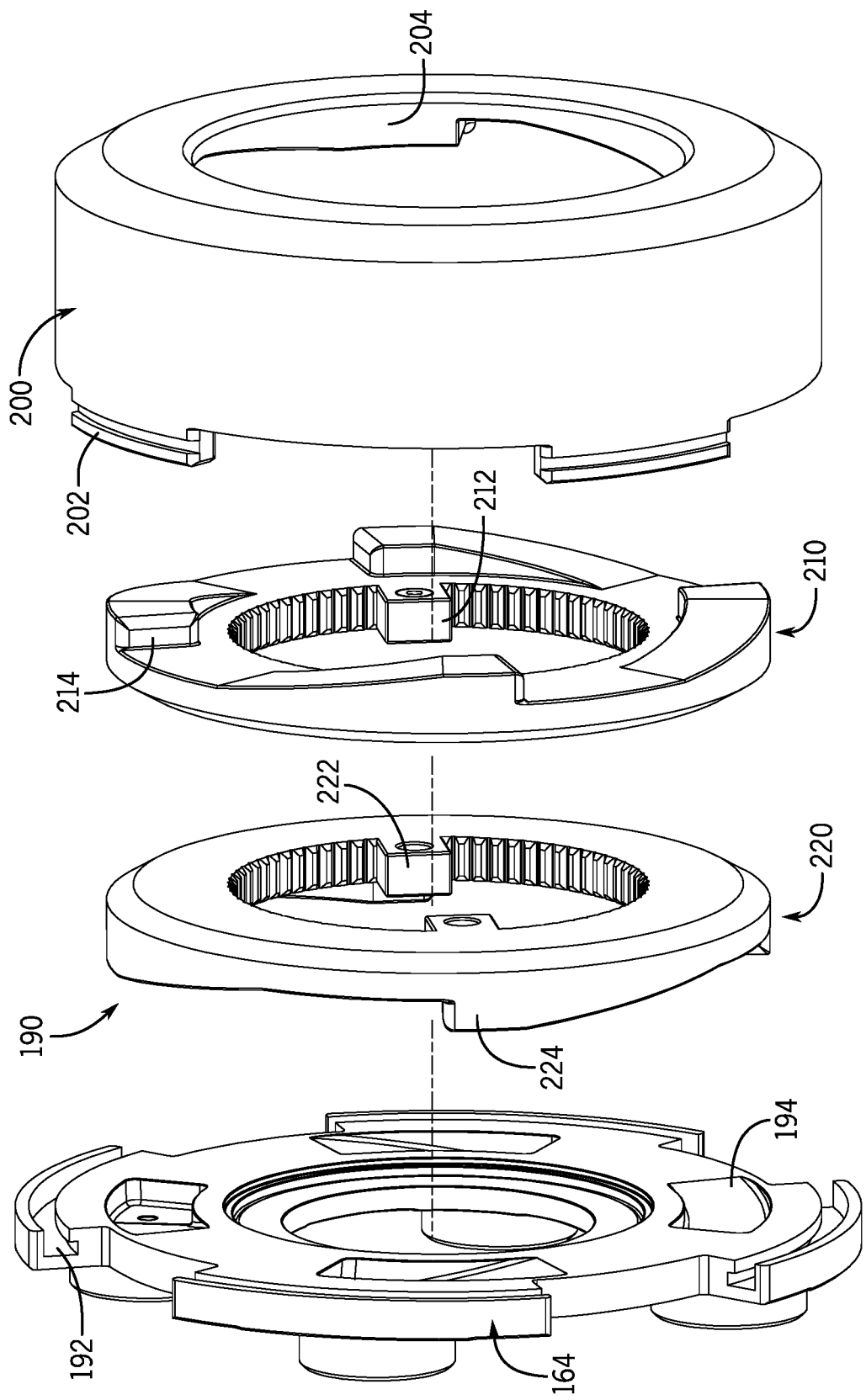
FIG. 13 is an isolated partial exploded view of a low clutch arrangement of the drive assembly of FIGS. 3 and 4.

Reference is initially made to the cross-sectional view of FIG. 10, as well as the partially exploded isolated view of FIG. 13, which depicts the low clutch arrangement 190 and the second-stage planet carrier 184. In one example, the low clutch arrangement 190 is generally formed by a carrier shell 200, a first low clutch ring 210, and a second low clutch ring 220. The first and second low clutch rings 210, 220 are generally ring-shaped and circumscribe the stationary spindle 110. The first and second low clutch rings 210, 220 are generally positioned proximate to the second-stage planet carrier 184. In particular, the clutch rings 210, 220 have inner splines that engage corresponding outer splines of the stationary spindle 110. In this example, the first clutch ring 210 is positioned closer to the input side of the drive assembly 56 relative to the second clutch ring 220 along the stationary spindle 110. The clutch rings 210, 220 further have mounting structures (or tabs) 212, 222, such that the first low clutch ring 210 is coupled to linkage 122 and the second low clutch ring 220 is coupled to linkage 126 for actuation by the low actuators 120, 124. In effect, the first and second low clutch rings 210, 220 may be considered a bifurcated clutch arrangement.

Briefly, and as discussed in greater detail below, the low clutch arrangement 190 may be selectively repositioned by the low actuators 120, 124 via the linkages 122, 126 into various positions relative to the carrier shell 200 and the second-stage planet carrier 184. In one example, the first low clutch ring 210 is configured such that the first low actuator 120 functions to reposition the first low clutch ring 210 via the linkages 122 towards the carrier shell 200 for mutual engagement; and upon deactivation of the first low actuator 120, a spring (not shown) is configured to reposition the first low clutch ring 210 away from the carrier shell 200 for mutual disengagement. In other embodiments, the first low clutch ring 210 is configured such that the first low actuator 120 functions to reposition the first low clutch ring 210 via the linkages 122 away from the carrier shell 200 for mutual disengagement; and upon deactivation of the low actuator 120, a spring (not shown) is configured to reposition the first low clutch ring 210 towards the carrier shell 200 for mutual engagement. Similarly, in one example, the second low clutch ring 220 is configured such that the second low actuator 124 functions to reposition the second low clutch ring 220 via the linkages 126 towards the second-stage planet carrier 184 for mutual engagement; and upon deactivation of the second low actuator 124, a spring (not shown) is configured to reposition the second low clutch ring 220 away from the second-stage planet carrier 184 for mutual disengagement. In other embodiments, the second low clutch ring 220 is configured such that the second low actuator 124 functions to reposition the second low clutch ring 220 via the linkages 126 away from the second-stage planet carrier 184 for mutual disengagement; and upon deactivation of the second low actuator 124, a spring (not shown) is configured to reposition the second low clutch ring 220 towards the second-stage planet carrier 184 for mutual engagement. Additional details regarding repositioning of the low clutch rings 210, 220 are provided below.

The carrier shell 200 is also generally ring shaped to circumscribe the stationary spindle 110 and has outer periphery mounting elements 202 configured to engage corresponding mounting elements 192 formed on the outer periphery of the second-stage planet carrier 184 to be rotationally fixed (e.g., rotates with or stationary with) to second-stage planet carrier 184 about the stationary spindle 110, in effect, at least partially enclose the low clutch rings 210, 220.

The first low clutch ring 210 has one or more engagement elements (e.g., representing a combination of cavities, protrusions, teeth, or dogs configured for circumferential engagement) 214 that are oriented towards the carrier shell 200. The carrier shell 200 has corresponding engagement elements 204 positioned on an inner periphery. As described below, the first low clutch ring 210 may be selectively positioned such that the first low clutch ring engagement elements 214 engage with the carrier shell structure engagement elements 204. In one embodiment, each of the first low clutch ring engagement elements 214 is respectively formed with a squared or perpendicular side and a ramped side, and the carrier shell structure engagement elements 224 are similarly respectively formed with squared or perpendicular side and a ramped side. Relative to a rotational or clock direction, the first low clutch ring engagement elements 214 oppose the carrier shell structure engagement elements 204 such that the first low clutch ring 210 may selectively interact with the carrier shell 200 in the single direction as discussed in greater detail below.

The second low clutch ring 220 has one or more engagement elements (e.g., representing a combination of cavities, protrusions, teeth, or dogs configured for circumferential engagement) 224 that are oriented towards the second-stage planet carrier 184. The second-stage planet carrier 184 has corresponding engagement elements 194 positioned in radial positions corresponding to the second low clutch ring engagement elements 224. As described below, the second low clutch ring 220 may be selectively positioned such that the second low clutch ring engagement elements 224 engage with the second-stage planet carrier engagement elements 194. In one embodiment, each of the second low clutch ring engagement elements 224 is respectively formed with a squared or perpendicular side and a ramped side, and the second-stage planet carrier engagement elements 194 are similarly respectively formed with squared or perpendicular side and a ramped side. Relative to a rotational or clock direction, the second low clutch ring engagement elements 224 oppose the planet carrier engagement elements 194 such that the second low clutch ring 220 may selectively interact with the second-stage planet carrier 184 in the single direction as discussed in greater detail below. Additionally, the second low clutch ring engagement elements 224 are oriented in an opposite clock direction relative to the first low clutch ring engagement elements 214.

The first and second low clutch rings 210, 220 may collectively be considered to have four axial positions to selectively interact with the gear set 150, as will now be introduced.

In a first collective position, the first low clutch ring 210 is positioned so as to not engage the carrier shell 200 and the second low clutch ring 220 is positioned so as to not engage the second-stage planet carrier 184. In this position, the second-stage planet carrier 184 and the carrier shell 200 may rotate independently of the low clutch rings 210, 220.

In a second collective position, the first low clutch ring 210 is positioned so as to engage the carrier shell 200 (e.g., the first low clutch ring 210 has been axially moved towards the carrier shell 200), and the second low clutch ring 220 is positioned so as to not engage the second-stage planet carrier 184. As noted above, the low clutch rings 210, 220 are rotationally stationary on the stationary spindle 110. Upon engagement and due the nature of the engagement elements 204, 214, the first low clutch ring 210 rotationally "grounds" (e.g., prevents from rotating) the carrier shell 200 in a first clock (or rotation) direction D1. In other words, the squared sides of the engagement elements 204, 214 oppose one another in the first clock direction D1 to ground the carrier shell 200; and since the carrier shell 200 is rotationally fixed to the second-stage planet carrier 184, engagement of the first low clutch ring 210 to the carrier shell 200 also functions to ground the second-stage planet carrier 184 in the first clock direction D1. Moreover, due the nature of the engagement elements 204, 214, the carrier shell 200 may "overrun" or "slip" (e.g., slide along the ramps) relative to the first low clutch ring 210 in a second clock (or rotation) direction D2 of the carrier shell 200; and since the carrier shell 200 is rotationally fixed to the second-stage planet carrier 184, the second-stage planet carrier 184 may rotate in the second clock direction D2, despite the engaged position of the first low clutch ring 210. It should be noted that the rotational of the second-stage planet carrier 184 in the second clock direction D2 is enabled by the unengaged position of the second low clutch ring 220. In this manner, the low clutch arrangement 190 may be considered unidirectionally engaged to ground the second-stage planet carrier 184 in the first clock direction D1 and not in the second clock direction D2.

In a third collective position, the second low clutch ring 220 is positioned so as to engage the second-stage planet carrier 184 (e.g., the second low clutch ring 220 has been axially moved towards the second-stage planet carrier 184), and the first low clutch ring 210 is positioned so as to not engage the carrier shell 200. Upon engagement and due the nature of the engagement elements 194, 224, the second low clutch ring 220 rotationally "grounds" (e.g., prevents from rotating) the second-stage planet carrier 184 in the second clock direction D2. In other words, the squared sides of the engagement elements 194, 224 oppose one another in the second clock direction D2 to ground the second-stage planet carrier 184. Moreover, due to the nature of the engagement elements 194, 224, the second-stage planet carrier 184 may "overrun" or "slip" (e.g., slide along the ramps) relative to the second low clutch ring 220 in the first clock direction D1 of the second-stage planet carrier 184, despite the engaged position of the second low clutch ring 220. It should be noted that the rotational of the second-stage planet carrier 184 in the first clock direction D1 is enabled by the unengaged position of the first low clutch ring 210. In this manner, the low clutch arrangement 190 may be considered unidirectionally engaged to ground the second-stage planet carrier 184 in the second clock direction D2 and not in the first clock direction D1.

In a fourth collective position, the first low clutch ring 210 is positioned so as to engage the carrier shell 200 (e.g., the first low clutch ring 210 has been axially moved towards the carrier shell 200), and the second low clutch ring 220 is positioned so as to engage the second-stage planet carrier 184. Upon engagement and due the nature of the engagement elements 204, 214, the first low clutch ring 210 rotationally "grounds" (e.g., prevents from rotating) the carrier shell 200 in a first clock direction D1. In other words, the squared sides of the engagement elements 204, 214 oppose one another in the first clock direction D1 to ground the carrier shell 200; and since the carrier shell 200 is rotationally fixed to the second-stage planet carrier 184, engagement of the first low clutch ring 210 to the carrier shell 200 also functions to ground the second-stage planet carrier 184 in the first clock direction D1. Moreover, upon engagement and due the nature of the engagement elements 194, 224, the second low clutch ring 220 rotationally "grounds" (e.g., prevents from rotating) the second-stage planet carrier 184 in the second clock direction D2. In other words, the squared sides of the engagement elements 194, 224 oppose one another in the second clock direction D2 to ground the second-stage planet carrier 184. In this manner, the low clutch arrangement 190 may be considered bi-directionally engaged to ground the second-stage planet carrier 184 in the first clock direction D1 and in the second clock direction D2.

Reference is additionally made to FIG. 13, which is an isolated isometric view of portions of the second-stage planet carrier 184, the carrier shell 200, the first low clutch ring 210, and the second low clutch ring 220. The view of FIG. 13 further depicts one example of the shape of the engagement elements 214, 224 on the low clutch rings 210, 220 and the corresponding engagement elements 194, 204 on the second-stage planet carrier 184 and the carrier shell 200, respectively.

Figure 14:
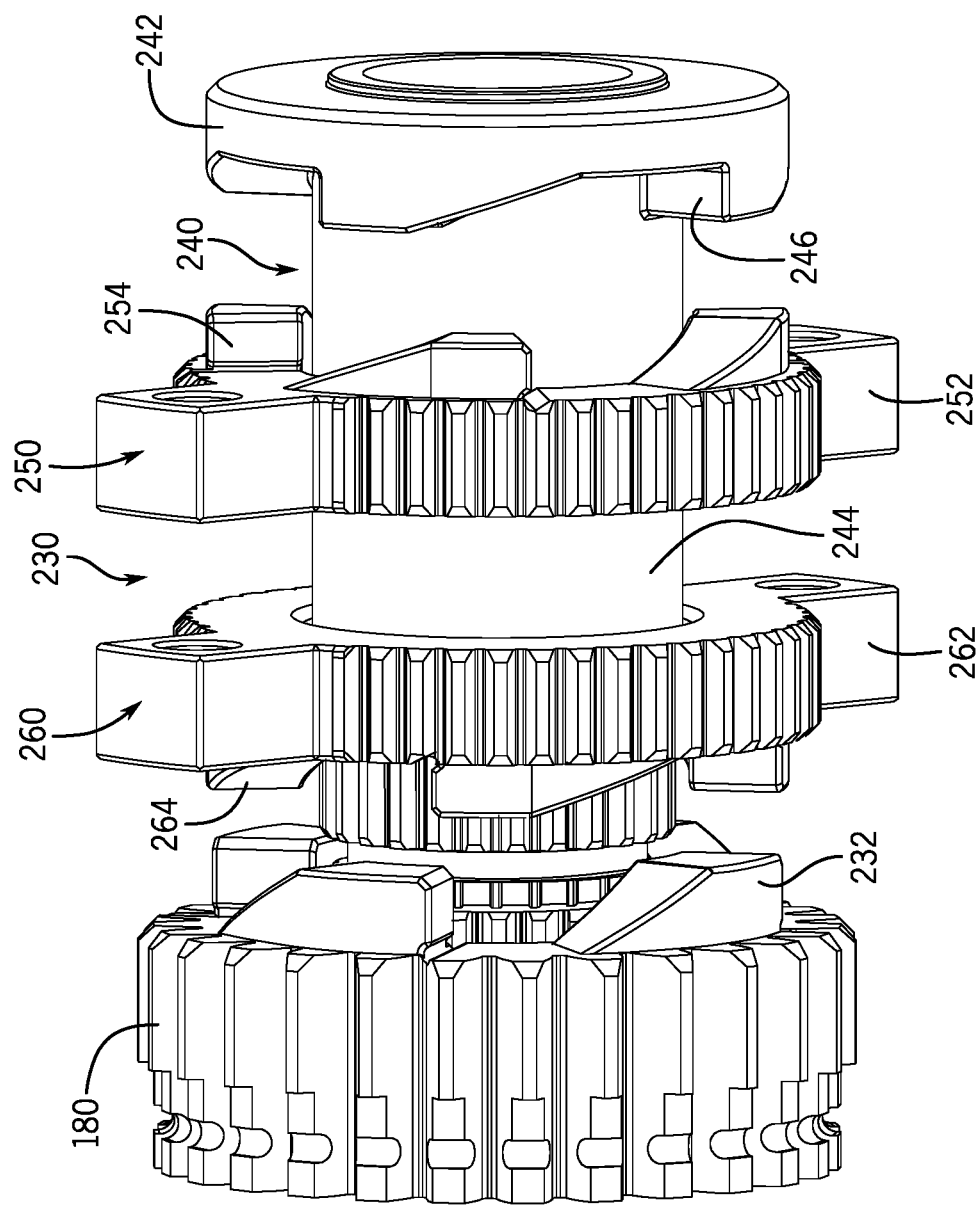
FIG. 14 is an isolated partial exploded view of a mid clutch arrangement of the drive assembly of FIGS. 3 and 4.

Reference is again made to the cross-sectional view of FIG. 10, as well as the partially exploded isolated view of FIG. 14, which depicts the mid clutch arrangement 230 and the second-stage sun gear 180. In one example, the mid clutch arrangement 230 is generally formed by a mid shaft sleeve 240, a first mid clutch ring 250, and a second mid clutch ring 260. The first and second mid clutch rings 250, 260 are generally ring-shaped and circumscribe the mid shaft sleeve 240 and are circumscribed by the stationary spindle 110. In particular, the first and second mid clutch rings 250, 260 have outer splines about a periphery that engage corresponding inner splines within the stationary spindle 110. As such, the first and second mid clutch rings 250, 260 are splined with the stationary spindle 110, and although circumscribing the mid shaft sleeve 240, are not splined with the mid shaft sleeve 240. In effect, the first and second mid clutch rings 250, 260 may be considered a bifurcated clutch arrangement The first and second mid clutch rings 250, 260 are generally positioned proximate to the second-stage sun gear 180. In this example, the first mid clutch ring 250 is positioned closer to the input side of the drive assembly 56 relative to the second mid clutch ring 260 along the mid shaft sleeve 240 and within stationary spindle 110. The mid clutch rings 250, 260 further have mounting structures (or tabs) 252, 262 such that the first mid clutch ring 250 is coupled to linkage 132 and the second mid clutch ring 260 is coupled to linkage 136 for actuation by the mid actuators 130, 134.

In this example, the mid shaft sleeve 240 circumscribes the drive shaft 152 (although not directly engaged with the drive shaft 152) with a head portion 242, generally oriented toward the input side of the gear set 150), and a sleeve portion 244 that extends partially into the gear set 150 through the mid clutch rings 250, 260. In this example, the sleeve portion 242 has a set of axially extending splines, and the sleeve portion 244 extends such that the splines of the mid shaft sleeve portion 244 engage corresponding inner splines of the second-stage sun gear 180. In this manner, the mid shaft sleeve 240 is rotationally fixed (e.g., rotates with or is stationary with) relative to the second-stage sun gear 180.

Briefly, and as discussed in greater detail below, the mid clutch arrangement 230 may be selectively repositioned by the mid actuators 130, 134 via the linkages 132, 136 into various positions relative to the second-stage sun gear 180 and the mid shaft sleeve 240. In one example, the first mid clutch ring 250 is configured such that the first mid actuator 130 functions to reposition the first mid clutch ring 250 via the linkages 132 towards the head portion 242 for mutual engagement with the mid shaft sleeve 240; and upon deactivation of the first mid actuator 130, a spring (not shown) is configured to reposition the first mid clutch ring 250 away from the head portion 242 for mutual disengagement relative to the mid shaft sleeve 240. In other embodiments, the first mid clutch ring 250 is configured such that the first mid actuator 130 functions to reposition the first mid clutch ring 250 via the linkages 132 away from the head portion 242 for mutual disengagement relative to the mid shaft sleeve 240 upon deactivation of the first mid actuator 130, a spring (not shown) is configured to reposition the first mid clutch ring 250 towards the head portion 242 for mutual engagement relative to the mid shaft sleeve 240. Similarly, in one example, the second mid clutch ring 260 is configured such that the second mid actuator 134 functions to reposition the second mid clutch ring 260 via the linkages 136 towards the second-stage sun gear 180 for mutual engagement; and upon deactivation of the second mid actuator 134, a spring (not shown) is configured to reposition the second mid clutch ring 260 away from the second-stage sun gear 180 for mutual disengagement. In other embodiments, the second mid clutch ring 260 is configured such that the second mid actuator 134 functions to reposition the second mid clutch ring 260 via the linkages 136 away from the second-stage sun gear 180 for mutual disengagement; and upon deactivation of the second mid actuator 134, a spring (not shown) is configured to reposition the second mid clutch ring 260 towards the second-stage sun gear 180 for mutual engagement. Additional details regarding repositioning of the mid clutch rings 250, 260 are provided below.

The first mid clutch ring 250 has one or more engagement elements (e.g., representing a combination of cavities, protrusions, teeth, or dogs configured for circumferential engagement) 254 that are oriented towards the head portion 242 of the mid shaft sleeve 240. The head portion 242 of the mid shaft sleeve 240 has corresponding engagement elements 246 positioned on an opposing surface. As described below, the first mid clutch ring 250 may be selectively positioned such that the first mid clutch ring engagement elements 254 engage with the mid sleeve shaft head portion engagement elements 246. In one embodiment, each of the first mid clutch ring engagement elements 254 is respectively formed with a squared or perpendicular side and a ramped side, and the mid sleeve shaft head portion engagement elements 246 are similarly respectively formed with squared or perpendicular side and a ramped side. Relative to a rotational or clock direction, the first mid clutch ring engagement elements 254 oppose the mid sleeve shaft head portion engagement elements 246 such that the first mid clutch ring 250 may selectively interact with the mid shaft sleeve 240 in the single direction as discussed in greater detail below.

The second mid clutch ring 260 has one or more engagement elements (e.g., representing a combination of cavities, protrusions, teeth, or dogs configured for circumferential engagement) 264 that are oriented towards the second-stage sun gear 180. The second-stage sun gear 180 has corresponding engagement elements 232 positioned in a radial position corresponding to the second mid clutch ring engagement elements 264. As described below, the second mid clutch ring 260 may be selectively positioned such that the second mid clutch ring engagement elements 264 engage with the second-stage sun gear engagement elements 232. In one embodiment, each of the second mid clutch ring engagement elements 264 is respectively formed with a squared or perpendicular side and a ramped side, and the second-stage sun gear engagement elements 232 are similarly respectively formed with squared or perpendicular side and a ramped side. Relative to a rotational or clock direction, the second mid clutch ring engagement elements 264 oppose the second-stage sun gear engagement elements 232 such that the second mid clutch ring 260 may selectively interact with the second-stage sun gear 180 in the single direction as discussed in greater detail below. Additionally, the second mid clutch ring engagement elements 264 are oriented in an opposite clock direction relative to the first mid clutch ring engagement elements 254. The first and second mid clutch rings 250, 260 may collectively be considered to have four axial positions to selectively interact with the gear set 150, as will now be introduced.

In a first collective position, the first mid clutch ring 250 is positioned so as to not engage the mid shaft sleeve 240 and the second mid clutch ring 260 is positioned so as to not engage the second-stage sun gear 180. In this position, the second-stage sun gear 180 and the mid shaft sleeve 240 may rotate independently of the mid clutch rings 250, 260.

In a second collective position, the first mid clutch ring 250 is positioned so as to engage the mid shaft sleeve 240 (e.g., the first mid clutch ring 250 has been axially moved towards the head portion 242 of the mid shaft sleeve 240), and the second mid clutch ring 260 is positioned so as to not engage the second-stage sun gear 180. As noted above, the mid clutch rings 250, 260 are rotationally stationary on the stationary spindle 110. Upon engagement and due the nature of the engagement elements 246, 254, the first mid clutch ring 250 rotationally "grounds" (e.g., prevents from rotating) the mid shaft sleeve 240 in the first clock direction D1. In other words, the squared sides of the engagement elements 246, 254 oppose one another in the first clock direction D1 to ground the mid shaft sleeve 240; and since the mid shaft sleeve 240 is rotationally fixed to the second-stage planet carrier 184, engagement of the first mid clutch ring 250 to the mid shaft sleeve 240 also functions to ground the second-stage sun gear 180 in the first clock direction D1. Moreover, due the nature of the engagement elements 246, 254, the mid shaft sleeve 240 may "overrun" or "slip" (e.g., slide along the ramps) relative to the first mid clutch ring 250 in the second clock direction D2 of the mid shaft sleeve 240; and since the mid shaft sleeve 240 is rotationally fixed to the second-stage sun gear 180, the second-stage sun gear 180 may rotate in the second clock direction D2, despite the engaged position of the first mid clutch ring 250. It should be noted that the rotational of the second-stage sun gear 180 in the second clock direction D2 is enabled by the unengaged position of the second mid clutch ring 260. In this manner, the mid clutch arrangement 230 may be considered unidirectionally engaged to ground the second-stage sun gear 180 in the first clock direction D1 and not in the second clock direction D2.

In a third collective position, the second mid clutch ring 260 is positioned so as to engage the second-stage sun gear 180 (e.g., the second mid clutch ring 260 has been axially moved towards the second-stage sun gear 180), and the first mid clutch ring 250 is positioned so as to not engage the head portion 242 of the mid shaft sleeve 240. Upon engagement and due the nature of the engagement elements 232, 264, the second mid clutch ring 260 rotationally "grounds" (e.g., prevents from rotating) the second-stage sun gear 180 in a second clock direction D2. In other words, the squared sides of the engagement elements 232, 264 oppose one another in the second clock direction D2 to ground the second-stage sun gear 180. Moreover, due the nature of the engagement elements 232, 264, the second-stage sun gear 180 may "overrun" or "slip" (e.g., slide along the ramps) relative to the second mid clutch ring 260 in the first clock direction D1 of the second-stage sun gear 180, despite the engaged position of the second mid clutch ring 260. It should be noted that the rotational of the second-stage sun gear 180 in the first clock direction D1 is enabled by the unengaged position of the first mid clutch ring 250. In this manner, the low clutch arrangement 190 may be considered unidirectionally engaged to ground the second-stage sun gear 180 in the second clock direction D2 and not in the first clock direction D1.

In a fourth collective position, the first mid clutch ring 250 is positioned so as to engage the mid shaft sleeve 240 (e.g., the first mid clutch ring 250 has been axially moved towards the mid shaft sleeve 240), and the second mid clutch ring 260 is positioned so as to engage the second-stage sun gear 180. Upon engagement and due the nature of the engagement elements 246, 254, the first mid clutch ring 250 rotationally "grounds" (e.g., prevents from rotating) the mid shaft sleeve 240 in the first clock direction D1. In other words, the squared sides of the engagement elements 246, 254 oppose one another in the first clock direction D1 to ground the mid shaft sleeve 240; and since the mid shaft sleeve 240 is rotationally fixed to the second-stage sun gear 180, engagement of the first mid clutch ring 250 to the mid shaft sleeve 240 also functions to ground the second-stage sun gear 180 in the first clock direction D1. Moreover, upon engagement and due the nature of the engagement elements 232, 264, the second mid clutch ring 260 rotationally "grounds" (e.g., prevents from rotating) the second-stage sun gear 180 in the second clock direction D2. In other words, the squared sides of the engagement elements 232, 264 oppose one another in the second clock direction D2 to ground the second-stage sun gear 180. In this manner, the mid clutch arrangement 230 may be considered bi-directionally engaged to ground the second-stage sun gear 180 in the first clock direction D1 and in the second clock direction D2.

Figure 11:
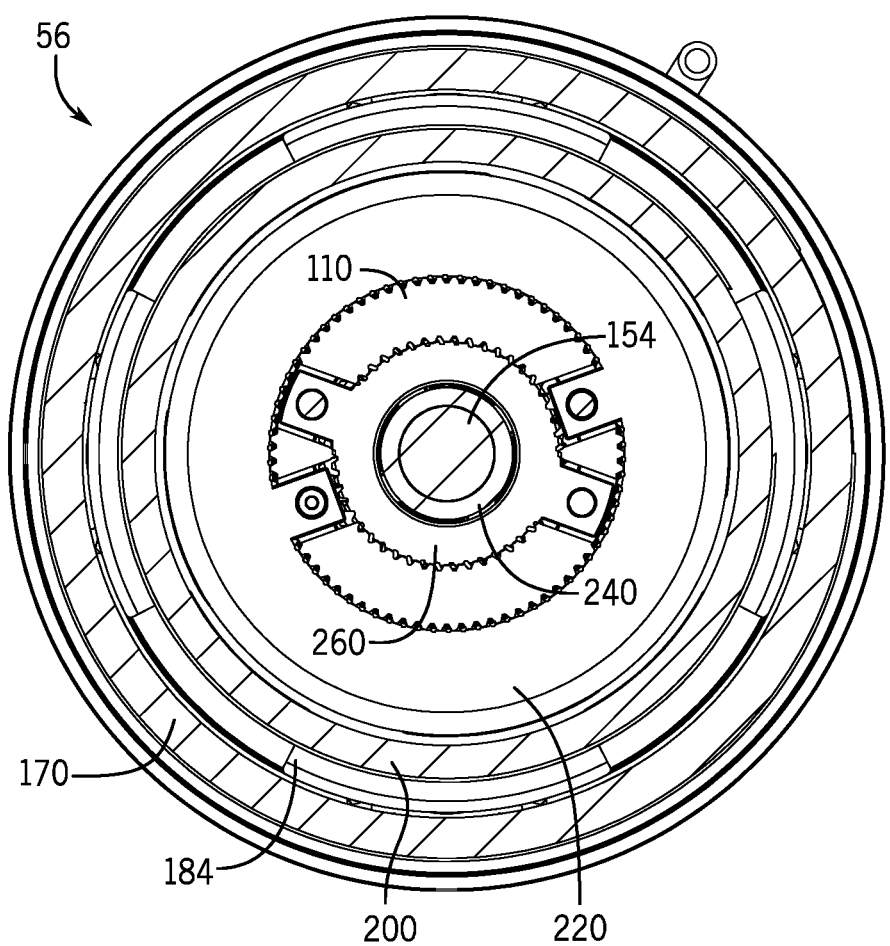
FIG. 11 is a second cross-sectional view of the drive assembly of FIGS. 3 and 4, through line 11-11 of FIG. 10.
Figure 12:
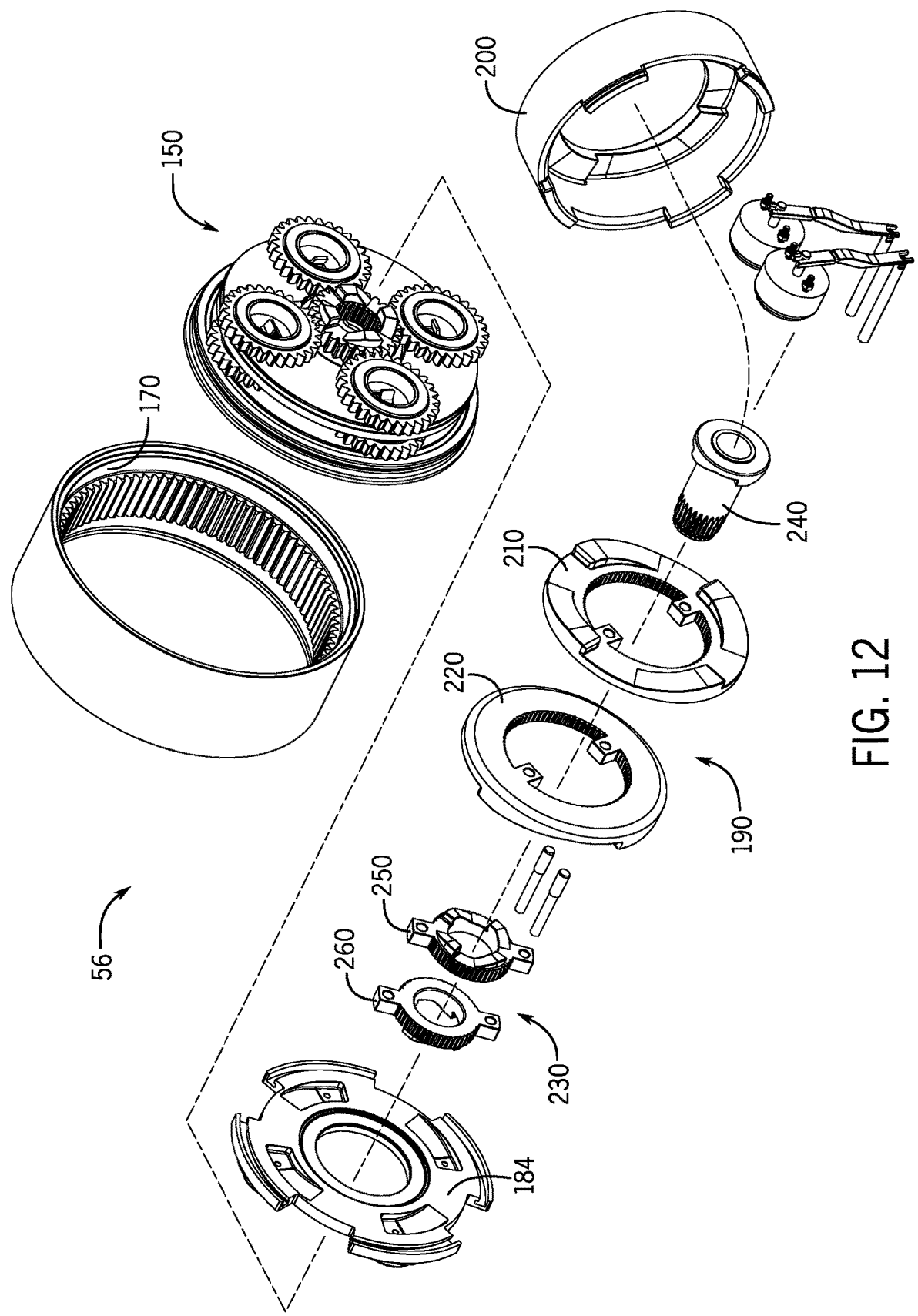
FIG. 12 is a partial exploded isometric view of the drive assembly of FIGS. 3 and 4 depicting the clutch arrangements.

The relationship of the low clutch arrangement 190 and the mid clutch arrangement 230 within the drive assembly 56 are more clearly depicted in FIGS. 11 and 12. For example, FIG. 11 is a second cross-sectional view of the drive assembly 56 through line 11-11 of FIG. 10; and FIG. 12 is a partial exploded isometric view of the drive assembly 56 of FIGS. 3 and 4. For example, FIG. 11 depicts the relationship between the stationary spindle 110, the drive shaft 152, the mid shaft sleeve 240, the second low clutch ring 220, and the second mid clutch ring 260, as well as the carrier shell 200, second-stage planet carrier 184 and the ring gear 170. As shown, the second low clutch ring 220 is splined to the outer surface of the stationary spindle 110; the second mid clutch ring 260 is splined to the inner surface of the stationary spindle 110; and the drive shaft 152 and the mid shaft sleeve 240 are configured to rotate relative to the second low clutch ring 220, the stationary spindle 110, and the second mid clutch ring 260. The view of FIG. 12 provides the exploded view of the ring gear 170 and the other portions of the gear set 150. The view of FIG. 12 particularly depicts the exploded relationship between second-stage planet carrier 184, the low clutch rings 210, 220 and carrier shell 200 of the low clutch arrangement 190, as well as the mid clutch rings 250, 260 and mid shaft sleeve 240 of the mid clutch arrangement 230.

Figure 15:
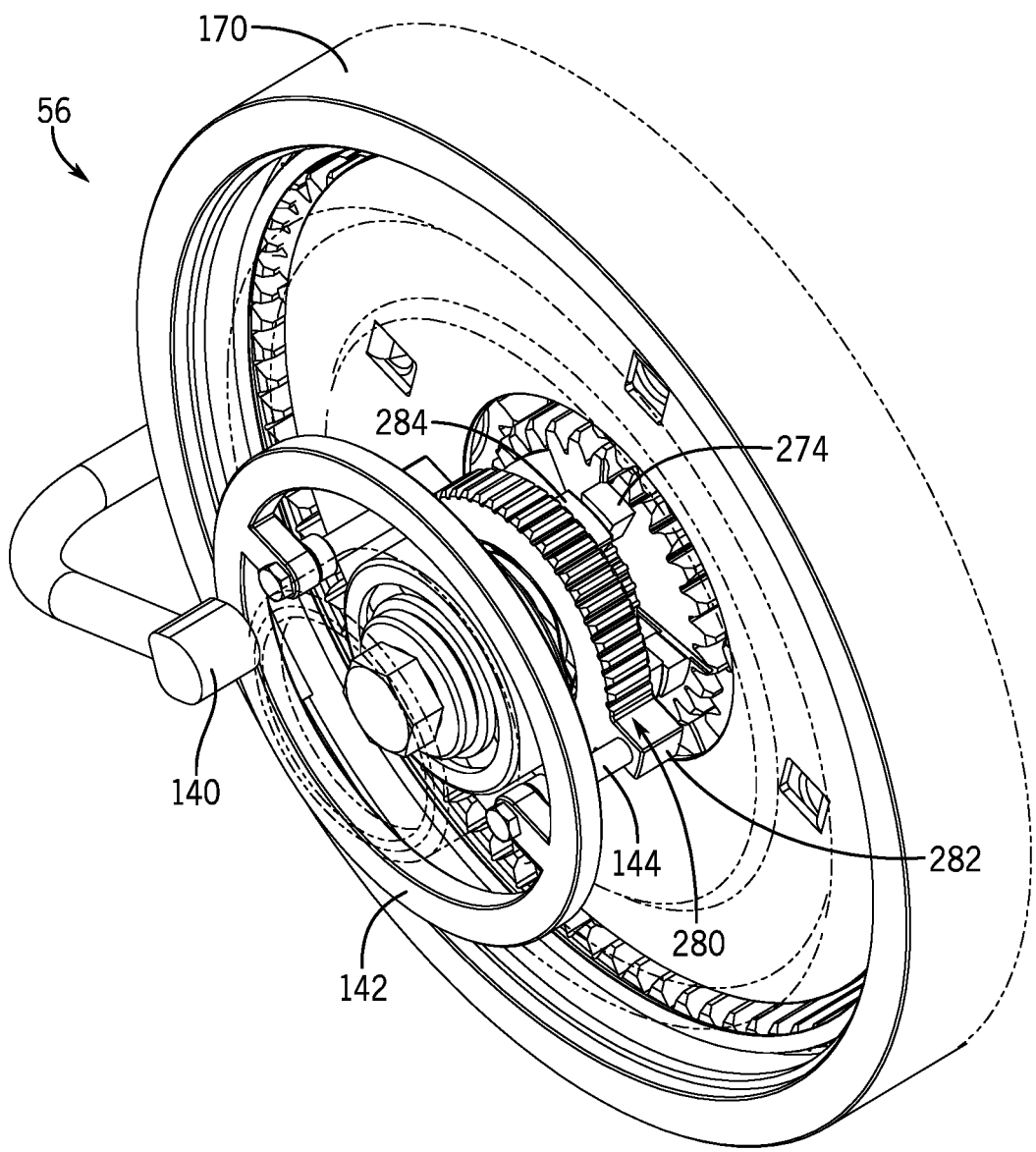
FIG. 15 is an end view of a high clutch arrangement of the drive assembly of FIGS. 3 and 4.

Reference is now made to FIGS. 10 and 15 for further discussion of the high clutch arrangement 270. In one example, the high clutch arrangement 270 is generally formed by a high clutch ring 280 that is generally ring-shaped and at least partially housed within a high clutch cavity 272 of the ring gear cover 102 (FIG. 9). The high clutch ring 280 includes a number of splines along an outer periphery that engage corresponding inner splines within the clutch cavity 272 of the ring gear cover 102. The high clutch ring 280 circumscribes the assembly drive shaft 152, although does not engage the drive shaft directly.

The high clutch ring 280 is generally positioned proximate to the first-stage sun gear 160. The high clutch ring 280 has mounting structures (or tabs) 282 such that the high clutch ring 280 is coupled to the linkage 144, which in turn is fixed to high actuator ring 142 to be repositioned by the high actuator 140.

The high clutch ring 280 has one or more engagement elements (e.g., representing a combination of cavities, protrusions, teeth, or dogs configured for circumferential engagement) 284 that are oriented towards the first-stage sun gear 160. The first-stage sun gear 160 has corresponding engagement elements 274 positioned on an opposing surface. As described below, the high clutch ring 280 may be selectively positioned such that the high clutch ring engagement elements 284 engage with the first-stage sun gear engagement elements 274. In one embodiment, the high clutch ring engagement elements 284 and the first-stage sun gear engagement elements 274 each have squared off or perpendicular sides.

Briefly, and as discussed in greater detail below, the high clutch arrangement 270 may be selectively repositioned by the high actuator 140 via the ring 142 and linkage 144 into two or more positions relative to the first-stage sun gear 160 and the ring gear cover 102, e.g., such that the first-stage sun gear 160 is rotationally fixed to or otherwise engaged with the ring gear cover 102, and thus the ring gear 170. In one example, the high clutch ring 280 is configured such that the high actuator 140 functions to reposition the first high clutch ring 280 via the ring 142 and linkage 144 away from the first-stage sun gear 160 such that the first-stage sun gear 160 is disengaged from the ring gear cover 102; and upon deactivation of the high actuator 140, a spring (not shown) is configured to reposition the high clutch ring 280 towards the first-stage sun gear 160 for mutual engagement of the first-stage sun gear 160 and the ring gear cover 102. In other embodiments, the high clutch ring 280 is configured such that the high actuator 140 functions to reposition the first high clutch ring 280 via the ring 142 and linkage 144 towards the first-stage sun gear 160 such that the first-stage sun gear 160 is engaged with the ring gear cover 102; and upon deactivation of the high actuator 140, a spring (not shown) is configured to reposition the high clutch ring 280 away from the first-stage sun gear 160 for mutual disengagement of the first-stage sun gear 160 relative to the ring gear cover 102. Additional details regarding repositioning of the high clutch ring 280 are provided below.

As such, in this embodiment, the high clutch ring 280 has a first position in which the engagement elements 284 are removed from and do not engage with the corresponding engagement elements 274 of the first-stage sun gear 160; and the high clutch ring 280 has a second position in which the engagement elements 284 are engaged with the corresponding engagement elements 274 of the first-stage sun gear 160. In this second position, the high clutch ring 280 functions to rotationally fix the ring gear cover 102 to the first-stage sun gear 160. Moreover, since the ring gear cover 102 is fixed to the ring gear 170 and the first-stage sun gear 160 is splined to the assembly drive shaft 152, the engaged position of the high clutch ring 280 functions to rotationally fix the assembly drive shaft 152 to the ring gear 170 and the output element 108. Additionally, due to the shape of the engagement elements 274, 284, the high clutch ring 280 may engage with the first-stage sun gear 160 in each of the first clock direction D1 and the second clock direction D2.

[0097] In this example, although the high clutch arrangement 270 has a single high clutch ring 280 that operates in a bi-directional manner, the high clutch arrangement 270 may be bifurcated (e.g., with two clutch rings, similar to the low clutch rings 210, 220 and mid clutch rings 250, 260) such that the high clutch arrangement 270 may selectively operate unidirectionally in either clock direction or bi-directionally in a manner similar to the low clutch arrangement 190 and the mid clutch arrangement 230.

The operation of the clutch arrangements 190, 230, 270 to modify the power flow through the gear set 150 will now be described with reference to FIGS. 16-18, which are cross-sectional views through different axial-radial planes of the drive assembly 56. Additional reference is made to FIGS. 10-15 regarding the structural details of the clutch arrangements 190, 230, 270. As introduced above, the gear set 150 of the drive assembly 56 is configured to transfer power between the input element 106 (e.g., at the drive shaft 152) and the output element 108 (e.g., at the ring gear 170 and/or ring gear cover 102).

As described below, the drive assembly 56 may operate in one or more modes representing different speeds (or "gears") and different output directions (e.g., "forward" as clock direction D1 and "reverse" as clock direction D2). As described below, the operational modes may include a forward low mode, a reverse low mode, a forward mid mode, a reverse mid mode, a forward high mode, and a reverse high mode.

Figure 16:
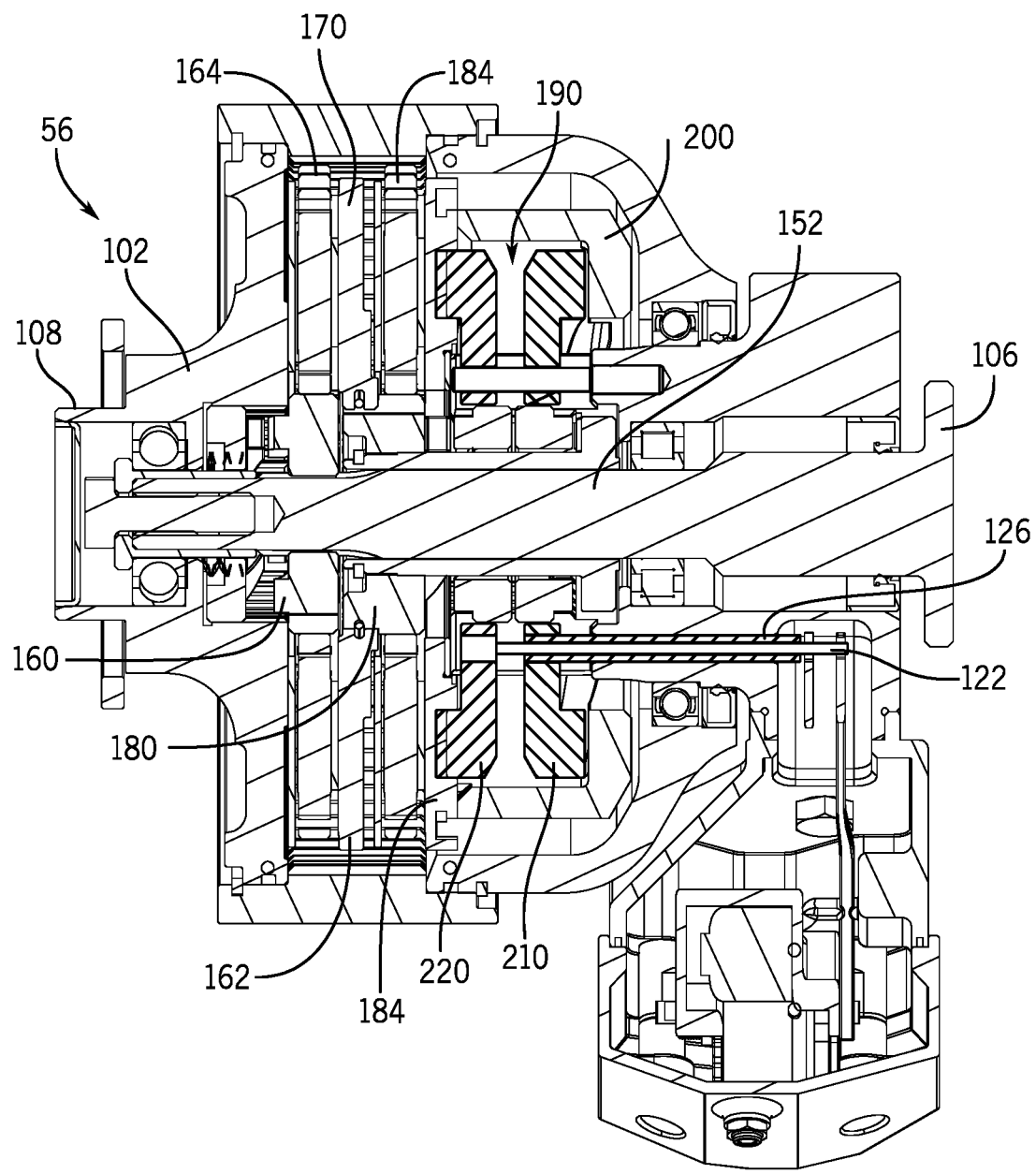
FIG. 16 is a cross-sectional view depicting actuation of the low clutch arrangement of the drive assembly of FIGS. 3 and 4, through line 16-16 of FIG. 7.

Referring initially to FIG. 16, in the forward low mode, the input element 106 is driven in the second clock direction D2. Moreover, in the forward low mode, the second low actuator 124 operates such that the second low clutch ring 210 engages the second-stage planet carrier 184 to ground the second-stage planet carrier 184. At least initially, the first low clutch ring 210 may be maintained in a disengaged position. In other words, in order to operate in the forward low mode, the low actuator 120, 124 may at least initially place the low clutch arrangement 190 in the second collective position discussed above. Moreover, the first and second mid clutch rings 250, 260 of the mid clutch arrangements 230 and the high clutch ring 280 of the high clutch arrangement 270 may be maintained in the disengaged positions.

As a result, in the forward low mode, the input element 106 drives the rotation of the first-stage sun gear 160, and in turn, rotation of the first-stage sun gear 160 drives rotation of the first-stage planet gears 162. The first-stage planet gears 162 drive the first-stage planet carrier 164, which as noted above is splined with the second-stage sun gear 180. As a result, the first-stage planet carrier 164 drives the second-stage sun gear 180 and thus the second-stage planet gears 182. As noted above, the second-stage planet carrier 184 is grounded by the second low clutch ring 220 in the input direction as the second clock direction D2. As such, rotation of the second-stage planet gears 182 operates to drive the ring gear 170. Since the number of second-stage planet gears 182 in the power flow path is an odd number (e.g., 1), the second-stage planet gears 182 drive the ring gear 170 in the opposite direction (e.g., the first clock direction D1) relative to the second-stage sun gear 180 rotating in the second clock direction D2.

In the reverse low mode, the input element 106 is driven in the first clock direction D1. Moreover, in the reverse low mode, the first low actuator 120 operates such that the first low clutch ring 210 engages the carrier shell 200 to ground the second-stage planet carrier 184 in the first clock direction D1. At least initially, the second low clutch ring 220 may be maintained in a disengaged position. In other words, in order to operate in the reverse low mode, the low actuators 120, 124 may at least initially place the low clutch arrangement 190 in the first collective position discussed above. Moreover, the first and second mid clutch rings 250, 260 of the mid clutch arrangement 230 and the high clutch ring 280 of the high clutch arrangement 270 may be maintained in the disengaged positions.

As a result, in the reverse low mode, the input element 106 drives the rotation of the first-stage sun gear 160, and in turn, rotation of the first-stage sun gear 160 drives rotation of the first-stage planet gears 162. The first-stage planet gears 162 drive the first-stage planet carrier 164, which as noted above is splined with the second-stage sun gear 180. As a result, the first-stage planet carrier 164 drives the second-stage sun gear 180 and thus the second-stage planet gears 182. As noted above, the second-stage planet carrier 184 is grounded by the first low clutch ring 210 in the input direction as the first clock direction D1. As such, rotation of the second-stage planet gears 182 operates to drive the ring gear 170, which is fixed to ring gear cover 102, a portion of which functions as the output element 108. Since the number of second-stage planet gears 182 in the power flow path is an odd number (e.g., 1), the second-stage planet gears 182 drive the ring gear 170 in the opposite direction (e.g., the second clock direction D2) relative to the second-stage sun gear 180 rotating in the first clock direction D1.

In this manner, the low clutch arrangement 190 may selectively operate in the forward low mode and reverse low mode, each respectively having a unidirectional drive direction and an overrun condition in the other direction. Moreover, in each of the forward low mode and the reverse low mode, the low clutch arrangement 190 may transition into a bi-directional configuration in order to facilitate shuttle shifts (e.g., transitioning from a forward direction to a reverse direction and vice versa). For example, in the forward low mode, the second low clutch ring 220 is initially engaged to ground the second-stage planet carrier 184 in the drive direction. Subsequently, the first low clutch ring 210 may be operated by the first low actuator 120 to engage the carrier shell 200 to ground to the second-stage planet carrier 184 in the opposite direction. Since engagement of the second low clutch ring 220 operates to ground the second-stage planet carrier 184, the first low clutch ring 210 may more readily engage with the carrier shell 200. In effect, the engagement of the second low clutch ring 220 functions to "synchronize" the carrier shell 200 for engagement with the first low clutch ring 210, even though the first low clutch ring 210 would not operate to ground the carrier shell 200 in the drive direction. A similar operation may occur in the reverse low mode in which the first low clutch ring 210 is initially engaged and subsequently the second low clutch ring 220 is engaged. In effect, the engagement of both first and second low clutch rings 210, 220 corresponds to the fourth collective position of the low clutch arrangement 190 discussed above.

Engagement of both of the first and second low clutch rings 210, 220 enables bi-directional operation in the low modes, e.g., to facilitate shuttle shifts. For example, when operating with both first and second low clutch rings 210, 220 engaged in the forward low mode in which the input direction of the second clock direction D2 drives in the output direction of the first clock direction D1, the drive assembly 56 may transition into the reverse low mode by reversing the input direction into the first clock direction D1 to drive in the output direction of the second clock direction D2. A similar transition may occur from a reverse low mode to a forward low mode.

In one example, the drive assembly 56 may provide a 15:1 gear ratio in the power flow direction of the forward and reverse low modes. In other embodiments, other gear ratios (e.g., 10:1-30:1) may be provided. Accordingly, the drive assembly 56 may deliver torque at relatively lower speeds and higher torque output.

Figure 17:
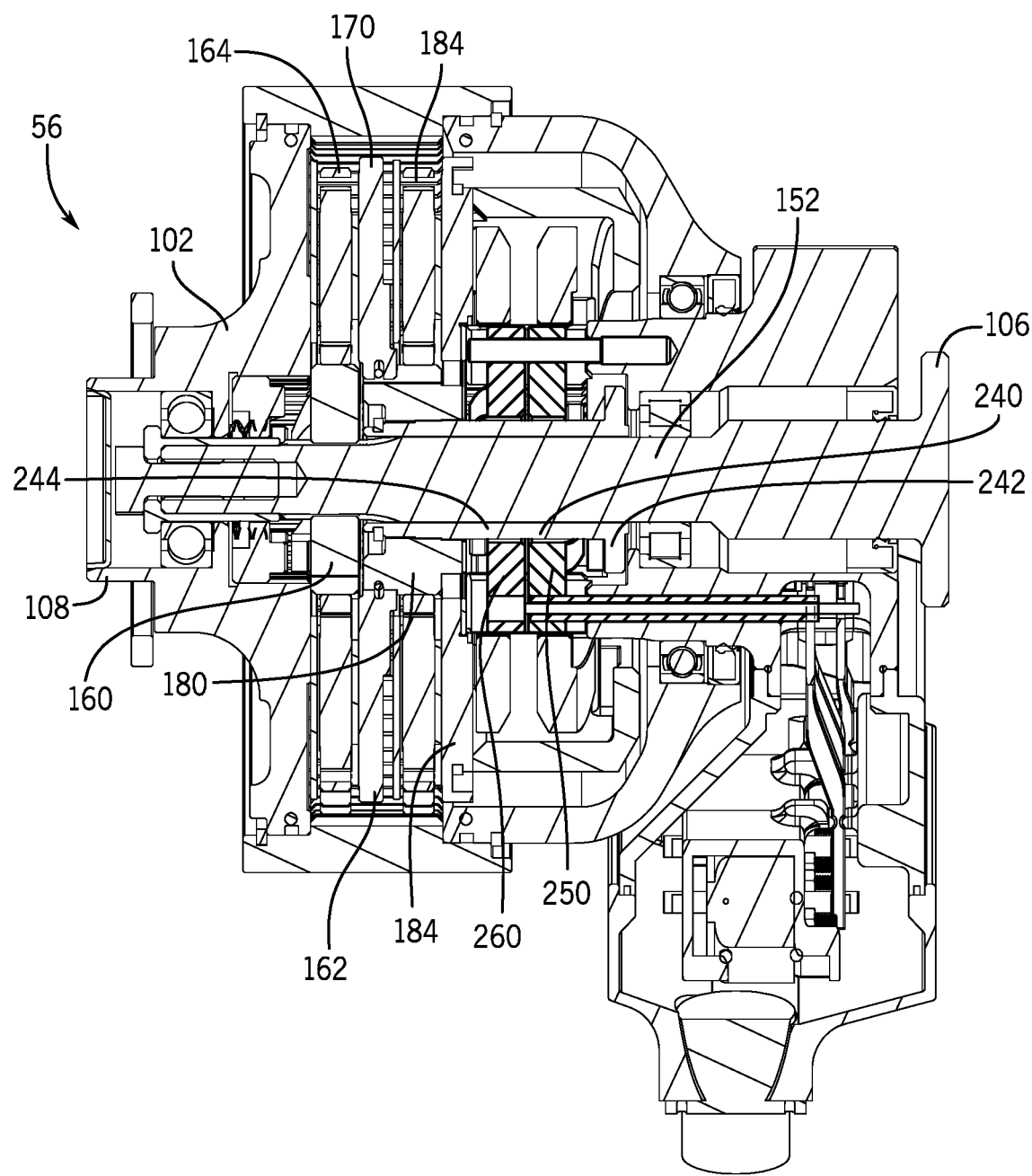
FIG. 17 is a cross-sectional view depicting actuation of the mid clutch arrangement of the drive assembly of FIGS. 3 and 4, through line 17-17 of FIG. 7.

Referring now to FIG. 17, in the forward mid mode, the input element 106 is driven in the second clock direction D2. Moreover, in the forward mid mode, the second mid actuator 134 operates such that the second mid clutch ring 260 engages the second-stage sun gear 180 to ground the second-stage sun gear 180. At least initially, the first mid clutch ring 250 may be maintained in a disengaged position. In other words, in order to operate in the forward mid mode, the mid actuators 130, 134 may at least initially place the mid clutch arrangement 230 in the second collective position discussed above. Moreover, the first and second low clutch rings 210, 220 of the low clutch arrangement 190 and the high clutch ring 280 of the high clutch arrangement 270 may be maintained in the disengaged positions.

As a result, in the forward mid mode, the input element 106 drives the rotation of the first-stage sun gear 160, and in turn, rotation of the first-stage sun gear 160 drives rotation of the first-stage planet gears 162. As noted above, the second-stage sun gear 180 is grounded by the second mid clutch ring 260, which in turn grounds the first-stage planet carrier 164 that is splined with the second-stage sun gear 180. The first-stage planet gears 162 drive the first-stage planet carrier 164, which as noted above is splined with the second-stage sun gear 180. Since the first-stage planet carrier 164 and second-stage sun gear 180 are grounded, rotation of the first-stage planet gears 162 drives rotation of the ring gear 170. Since the number of first-stage planet gears 162 in the power flow path is an odd number (e.g., 1), the first-stage planet gears 162 drive the ring gear 170 in the opposite direction (e.g., the first clock direction D1) relative to the assembly drive shaft 152 and the first-stage sun gear 160 rotating in the second clock direction D2. As noted above, the ring gear 170 is fixed to ring gear cover 102, a portion of which functions as the output element 108.

In the reverse mid mode, the input element 106 is driven in the first clock direction D1. Moreover, in the reverse mid mode, the first mid actuator 130 operates such that the first mid clutch ring 250 engages the head portion 242 of the mid shaft sleeve 240 to ground the second-stage sun gear 180 in the first clock direction D1. At least initially, the second mid clutch ring 260 may be maintained in a disengaged position. In other words, in order to operate in the reverse mid mode, the mid actuators 130, 134 may at least initially place the mid clutch arrangement 230 in the first collective position discussed above. Moreover, the first and second low clutch rings 210, 220 of the low clutch arrangement 190 and the high clutch ring 280 of the high clutch arrangement 270 may be maintained in the disengaged positions.

As a result, in the reverse mid mode, the input element 106 drives the rotation of the first-stage sun gear 160, and in turn, rotation of the first-stage sun gear 160 drives rotation of the first-stage planet gears 162. The first-stage planet gears 162 drive the ring gear 170 in view of the grounded first-stage planet carrier 164 and second-stage sun gear 180. Since the number of first-stage planet gears 162 in the power flow path is an odd number (e.g., 1), the first-stage planet gears 162 drive the ring gear 170 in the opposite direction (e.g., the second clock direction D2) relative to the assembly drive shaft 152 and the first-stage sun gear 160 rotating in the first clock direction D1.

In this manner, the mid clutch arrangement 230 may selectively operate in the forward mid mode and reverse mid mode, each respectively having a unidirectional drive direction and an overrun condition in the other direction. Moreover, in each of the forward mid mode and the reverse mid mode, the mid clutch arrangement 230 may transition into a bi-directional configuration in order to facilitate shuttle shifts (e.g., transitioning from a forward direction to a reverse direction and vice versa). For example, in the forward mid mode, the second mid clutch ring 260 is initially engaged to ground the second-stage sun gear 180 in the drive direction. Subsequently, the first mid clutch ring 250 may be operated by the first mid actuator 130 to engage the mid shaft sleeve 240 to ground to the second-stage sun gear 180 in the opposite direction. Since engagement of the second mid clutch ring 260 operates to ground the second-stage sun gear 180, the first mid clutch ring 250 may more readily engage with the mid shaft sleeve 240. In effect, the engagement of the second mid clutch ring 260 functions to "synchronize" the mid shaft sleeve 240 for engagement with the first mid clutch ring 250, even though the first mid clutch ring 250 would not operate to ground the mid shaft sleeve 240 in the drive direction. A similar operation may occur in the reverse low mode in which the first mid clutch ring 250 is initially engaged and subsequently the second mid clutch ring 260 is engaged. In effect, the engagement of both first and second mid clutch rings 250, 260 corresponds to the fourth collective position of the mid clutch arrangement 230 discussed above.

Engagement of both of the first and second mid clutch rings 250, 260 enables bi-directional operation in the mid modes, e.g., to facilitate shuttle shifts. For example, when operating with both first and second mid clutch rings 250, 260 engaged in the forward mid mode in which the input direction of the second clock direction D2 drives in the output direction of the first clock direction D1, the drive assembly 56 may transition into the reverse mid mode by reversing the input direction into the first clock direction D1 to drive in the output direction of the second clock direction D2. A similar transition may occur from a reverse mid mode to a forward mid mode.

In one example, the drive assembly 56 may provide a 4:1 gear ratio in the power flow direction of the forward and reverse mid modes. In other embodiments, other gear ratios (e.g., 3:1-7:1) may be provided. Accordingly, the drive assembly 56 may deliver torque at relatively higher speeds and relatively lower torque output.

Figure 18:
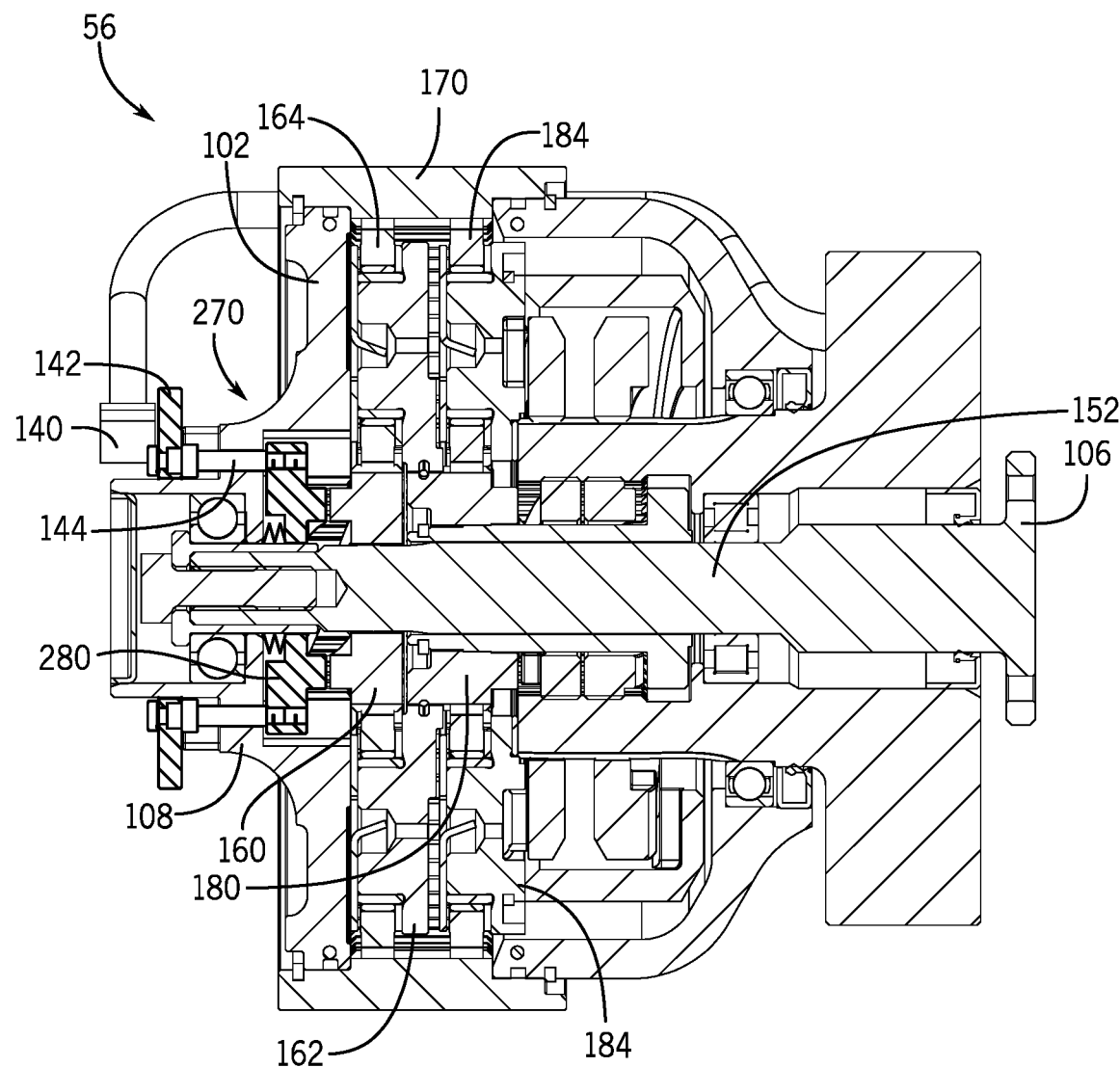
FIG. 18 is a cross-sectional view depicting actuation of the high clutch arrangement of the drive assembly of FIGS. 3 and 4 according to an embodiment.

Referring now to FIG. 18, in the forward high mode, the input element 106 is driven in the first clock direction D1. Moreover, in the forward high mode, the high actuator 140 operates such that the high clutch ring 280 engages the first-stage sun gear 160 to rotationally fix the first-stage sun gear 160 to the ring gear cover 102. Moreover, the first and second low clutch rings 210, 220 of the low clutch arrangement 190 and the first and second mid clutch rings 250, 260 of the mid clutch arrangement 230 may be maintained in the disengaged positions.

As a result, in the forward high mode, the input element 106 drives the rotation of assembly drive shaft 152 and the first-stage sun gear 160. Since the first-stage sun gear 160 is rotationally fixed to ring gear cover 102, the assembly drive shaft 152 is rotationally fixed to the ring gear 170. As such, rotation of the assembly drive shaft 152 drives the ring gear 170, as well as of the first-stage sun gear 160, the first-stage planet gears 162, the first-stage planet carrier 164, the second-stage sun gear 180, and the second-stage planet gears 182, about the primary rotational axis. In effect, the gear set 150 rotates as a unit about the primary rotational axis. Since the other components of the planetary gear set 150 rotate with the assembly drive shaft 152, the ring gear 170 is driven in the same first clock direction D1. As noted above, the ring gear 170 is fixed to ring gear cover 102, a portion of which functions as the output element 108.

In the reverse high mode, operation of high clutch arrangement 270 is identical to that in the forward high mode, except that the input element 106 is driven in the second clock direction D2 such that the ring gear 170 is also driven in the second clock direction D2. In this manner, the high clutch arrangement 270 may selectively operate in the forward high mode and reverse high mode with bi-directionality based on the direction of the input element 106. As noted above, in other examples, the high clutch arrangement may be configured to selectively operate unidirectionally (e.g., with multiple gear rings).

In this example, the drive assembly 56 provides a 1:1 gear ratio or direct gear ratio in the power flow direction of the forward and reverse high modes. In other embodiments, other gear ratios may be provided.

As detailed above, the actuators 120, 124, 130, 134, 140 may operate to engage and disengage the clutch arrangements 190, 230, 270 in order to transition between and implement the speeds or modes. The transitions are between directions and speeds are dependent on the direction of the input from the electric machines 52 (FIG. 2B). In some examples, the direction of the input element 106 (e.g., the direction of the electric machines 52 (FIG. 2B)) may also be used to facilitate or improve the transitions between speeds and directions. For example, in a transition from the forward mid mode to the forward high mode, if the first mid clutch ring 250 (e.g., the non-driven mid clutch ring) is not already disengaged, the first mid clutch ring 250 may be disengaged. Subsequently, in preparation for the forward high mode, the second mid clutch ring 260 may be disengaged and the assembly drive shaft 152 may be reversed in direction. The reversal in direction of the assembly drive shaft 152 operates to push the second mid clutch ring 260 out of the engagement with the second-stage sun gear 180 via the ramped side wall of the engagement element. Similar operation occurs in a transition between a reverse mid mode to a reverse high mode, between a forward low mode to a forward high mode, and between a reverse low mode and a reverse high mode.

Although the drive assembly 56 is described above with respect to a three-speed drive assembly, one or more of the clutch arrangements 190, 230, 270 (and associated actuators 120, 124, 130, 134, 140) may be omitted to result in a two-speed drive assembly. Moreover, although the first and second clutch arrangements 190, 230 are described above as bifurcated clutch arrangements, one or more the clutch rings 210, 220, 250, 260 of each clutch arrangement 190, 230 may be omitted to, in effect, operate as overrunning clutches in the driven directions. Any suitable modification or configuration according to the principles discussed above may be provided.

Also, the following examples are provided, which are numbered for easier reference.

1. A drive assembly for a work vehicle comprising: a drive housing including a first housing element forming a reaction member; a drive shaft rotatable about a drive axis relative to the reaction member in a first rotation direction and alternatively a second rotation direction; a planetary gear set coupled to the drive shaft and configured to selectively rotate an output element in the first rotation direction and in the second rotation direction; a first clutch arrangement coupled to the reaction member and including a first clutch ring and a second clutch ring, wherein the first clutch ring of the first clutch arrangement is configured to interface the planetary gear set with the reaction member to effect a first rotation speed of the output element in the second rotation direction and the second clutch ring of the first clutch arrangement is configured to interface the planetary gear set with the reaction member to effect the first rotation speed of the output element in the first rotation direction; a second clutch arrangement to interface with the planetary gear set to selectively effect a second rotation speed of the output element in the first rotation direction and in the second rotation direction; at least one first actuator configured to effect movement of the first clutch arrangement along the drive axis to selectively engage the planetary gear set; and at least one second actuator configured to effect movement of the second clutch arrangement along the drive axis to selectively engage the planetary gear set.

2. The drive assembly of example 1, wherein the at least one first actuator includes one first actuator configured to effect movement of the first clutch ring of the first clutch arrangement relative to the planetary gear set and another first actuator configured to effect movement of the second clutch ring of the first clutch arrangement relative to the planetary gear set.

3. The drive assembly of example 1, wherein the first clutch ring of the first clutch arrangement is configured to engage the planetary gear set when the output element is driven in the second rotation direction and to overrun the planetary gear set when the output element is driven in the first rotation direction.

4. The drive assembly of example 3, wherein the first clutch ring of the first clutch arrangement includes first clutch ring engagement elements, each with a perpendicular side configured to engage the planetary gear set when the output element is driven in the second rotation direction and a ramped side configured to overrun the planetary gear set when the output element is driven in the first rotation direction.

5. The drive assembly of example 4, wherein the second clutch ring of the first clutch arrangement includes second clutch ring engagement elements, each with a perpendicular side configured to engage the planetary gear set when the output element is driven in the first rotation direction and a ramped side configured to overrun the planetary gear set when the output element is driven in the second rotation direction.

6. The drive assembly of example 5, wherein the first clutch ring and the second clutch ring of the first clutch arrangement are positioned such that the first clutch ring engagement elements are oriented in an opposite axial direction relative to that of the second clutch ring engagement elements.

7. The drive assembly of example 4, wherein the second clutch arrangement includes a first clutch ring and a second clutch ring, wherein the first clutch ring of the second clutch arrangement is configured to interface the planetary gear set with the reaction member to effect the second rotation speed of the output element in the second rotation direction and the second clutch ring of the second clutch arrangement is configured to interface the planetary gear set with the reaction member to effect the second rotation speed of the output element in the first rotation direction.

8. The drive assembly of example 7, wherein the first clutch ring of the second clutch arrangement is configured to engage the planetary gear set when the output element is driven in the second rotation direction and to overrun the planetary gear set when the output element is driven in the first rotation direction.

9. The drive assembly of example 8, wherein the first clutch ring of the second clutch arrangement includes first clutch ring engagement elements of the second clutch arrangement, each with a perpendicular side configured to engage the planetary gear set when the output element is driven in the second rotation direction and a ramped side configured to overrun the planetary gear set when the output element is driven in the first rotation direction; and wherein the second clutch ring of the second clutch arrangement includes second clutch ring engagement elements of the second clutch arrangement, each with a perpendicular side configured to engage the planetary gear set when the output element is driven in the first rotation direction and a ramped side configured to overrun the planetary gear set when the output element is driven in the second rotation direction.

10. The drive assembly of example 9, wherein the first clutch ring and the second clutch ring of the second clutch arrangement are positioned such that the first clutch ring engagement elements of the second clutch arrangement are oriented in an opposite axial direction relative to that of the second clutch ring engagement elements of the second clutch arrangement.

11. The drive assembly of example 9, further comprising a third clutch arrangement comprising a clutch ring, wherein the clutch ring of the third clutch arrangement is configured to interface with the planetary gear set to selectively effect a third rotation speed of the output element in the first rotation direction and in the second rotation direction.

12. The drive assembly of example 1, wherein the planetary gear set includes at least one sun gear, at least one carrier and at least one ring gear; and wherein the first clutch arrangement is configured to at least indirectly engage with the at least one carrier to interface with the reaction member to effect the first rotation speed of the output element.

13. The drive assembly of example 12, wherein the planetary gear set further includes a carrier shell that at least partially encloses the first clutch ring and the second clutch ring of the first clutch arrangement, the carrier shell being rotationally fixed to the at least one carrier, and wherein the first clutch ring of the first clutch arrangement is configured to engage the carrier shell to interface the at least one carrier with the reaction member to effect the first rotation speed of the output element in the second rotation direction, and wherein the second clutch ring of the first clutch arrangement is configured to engage the at least one carrier to interface the at least one carrier with the reaction member to effect the first rotation speed of the output element in the first rotation direction.

14. The drive assembly of example 1, wherein the planetary gear set includes at least one sun gear, at least one carrier and at least one ring gear; and wherein the first clutch arrangement is configured to at least indirectly engage the at least one sun gear to interface with the reaction member to effect the second rotation speed of the output element.

15. The drive assembly of example 14, wherein the planetary gear set further includes at least one sleeve that has a first end rotationally fixed to the at least one sun gear and a second end with a head portion, wherein the first clutch ring and the second clutch ring are arranged on the at least one sleeve axially in between the at least one sun gear and the head portion, wherein the first clutch ring of the first clutch arrangement is configured to engage the head portion of the at least one sleeve to interface the at least one sun gear with the reaction member to effect the first rotation speed of the output element in the second rotation direction, and wherein the second clutch ring of the first clutch arrangement is configured to engage the at least one sun gear to interface the at least one sun gear with the reaction member to effect the first rotation speed of the output element in the first rotation direction.

As will be appreciated by one skilled in the art, certain aspects of the disclosed subject matter can be embodied as a method, system (e.g., a work vehicle control system included in a work vehicle), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

Any suitable computer usable or computer readable medium can be utilized. The computer usable medium can be a computer readable signal medium or a computer readable storage medium. A computer-usable, or computer-readable, storage medium (including a storage device associated with a computing device or client electronic device) can be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium can be any tangible medium that can contain, or store a program for use by or in connection with the instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electro-magnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

Aspects of certain embodiments are described herein can be described with reference to flowchart illustrations and/or block diagrams of methods, apparatus (systems) and computer program products according to embodiments of the disclosure. It will be understood that each block of any such flowchart illustrations and/or block diagrams, and combinations of blocks in such flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which includes one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A drive assembly for a work vehicle comprising:
    a drive housing including a first housing element forming a reaction member;
    a drive shaft rotatable about a drive axis relative to the reaction member in a first rotation direction and alternatively a second rotation direction;
    a planetary gear set coupled to the drive shaft and configured to selectively rotate an output element in the first rotation direction and in the second rotation direction;
    a first clutch arrangement coupled to the reaction member and including a first clutch ring and a second clutch ring, wherein the first clutch ring of the first clutch arrangement is configured to interface the planetary gear set with the reaction member to effect a first rotation speed of the output element in the second rotation direction and the second clutch ring of the first clutch arrangement is configured to interface the planetary gear set with the reaction member to effect the first rotation speed of the output element in the first rotation direction;

a second clutch arrangement to interface with the planetary gear set to selectively effect a second rotation speed of the output element in the first rotation direction and in the second rotation direction;

at least one first actuator configured to effect movement of the first clutch arrangement along the drive axis to selectively engage the planetary gear set; and at least one second actuator configured to effect movement of the second clutch arrangement along the drive axis to selectively engage the planetary gear set.

2. The drive assembly of claim 1, wherein the at least one first actuator includes one first actuator configured to effect movement of the first clutch ring of the first clutch arrangement relative to the planetary gear set and another first actuator configured to effect movement of the second clutch ring of the first clutch arrangement relative to the planetary gear set.

3. The drive assembly of claim 1, wherein the first clutch ring of the first clutch arrangement is configured to engage the planetary gear set when the output element is driven in the second rotation direction and to overrun the planetary gear set when the output element is driven in the first rotation direction.

4. The drive assembly of claim 3, wherein the first clutch ring of the first clutch arrangement includes first clutch ring engagement elements, each with a perpendicular side configured to engage the planetary gear set when the output element is driven in the second rotation direction and a ramped side configured to overrun the planetary gear set when the output element is driven in the first rotation direction.

5. The drive assembly of claim 4, wherein the second clutch ring of the first clutch arrangement includes second clutch ring engagement elements, each with a perpendicular side configured to engage the planetary gear set when the output element is driven in the first rotation direction and a ramped side configured to overrun the planetary gear set when the output element is driven in the second rotation direction.

6. The drive assembly of claim 5, wherein the first clutch ring and the second clutch ring of the first clutch arrangement are positioned such that the first clutch ring engagement elements are oriented in an opposite axial direction relative to that of the second clutch ring engagement elements.

7. The drive assembly of claim 4,
wherein the second clutch arrangement includes a first clutch ring and a second clutch ring, wherein the first clutch ring of the second clutch arrangement is configured to interface the planetary gear set with the reaction member to effect the second rotation speed of the output element in the second rotation direction and the second clutch ring of the second clutch arrangement is configured to interface the planetary gear set with the reaction member to effect the second rotation speed of the output element in the first rotation direction.

8. The drive assembly of claim 7, wherein the first clutch ring of the second clutch arrangement is configured to engage the planetary gear set when the output element is driven in the second rotation direction and to overrun the planetary gear set when the output element is driven in the first rotation direction.

9. The drive assembly of claim 8,
wherein the first clutch ring of the second clutch arrangement includes first clutch ring engagement elements of the second clutch arrangement, each with a perpendicular side configured to engage the planetary gear set when the output element is driven in the second rotation direction and a ramped side configured to overrun the planetary gear set when the output element is driven in the first rotation direction; and wherein the second clutch ring of the second clutch arrangement includes second clutch ring engagement elements of the second clutch arrangement, each with a perpendicular side configured to engage the planetary gear set when the output element is driven in the first rotation direction and a ramped side configured to overrun the planetary gear set when the output element is driven in the second rotation direction.

10. The drive assembly of claim 9, wherein the first clutch ring and the second clutch ring of the second clutch arrangement are positioned such that the first clutch ring engagement elements of the second clutch arrangement are oriented in an opposite axial direction relative to that of the second clutch ring engagement elements of the second clutch arrangement.

11. The drive assembly of claim 9, further comprising a third clutch arrangement comprising a clutch ring, wherein the clutch ring of the third clutch arrangement is configured to interface with the planetary gear set to selectively effect a third rotation speed of the output element in the first rotation direction and in the second rotation direction.

12. The drive assembly of claim 1,
wherein the planetary gear set includes at least one sun gear, at least one carrier and at least one ring gear; and
wherein the first clutch arrangement is configured to at least indirectly engage with the at least one carrier to interface with the reaction member to effect the first rotation speed of the output element.

13. The drive assembly of claim 12,
wherein the planetary gear set further includes a carrier shell that at least partially encloses the first clutch ring and the second clutch ring of the first clutch arrangement, the carrier shell being rotationally fixed to the at least one carrier, and
wherein the first clutch ring of the first clutch arrangement is configured to engage the carrier shell to interface the at least one carrier with the reaction member to effect the first rotation speed of the output element in the second rotation direction, and
wherein the second clutch ring of the first clutch arrangement is configured to engage the at least one carrier to interface the at least one carrier with the reaction member to effect the first rotation speed of the output element in the first rotation direction.

14. The drive assembly of claim 1,
wherein the planetary gear set includes at least one sun gear, at least one carrier and at least one ring gear; and
wherein the first clutch arrangement is configured to at least indirectly engage the at least one sun gear to interface with the reaction member to effect the second rotation speed of the output element.

15. The drive assembly of claim 14,
wherein the planetary gear set further includes at least one sleeve that has a first end rotationally fixed to the at least one sun gear and a second end with a head portion,
wherein the first clutch ring and the second clutch ring are arranged on the at least one sleeve axially in between the at least one sun gear and the head portion, wherein the first clutch ring of the first clutch arrangement is configured to engage the head portion of the at least one sleeve to interface the at least one sun gear with the reaction member to effect the first rotation speed of the output element in the second rotation direction, and wherein the second clutch ring of the first clutch arrangement is configured to engage the at least one sun gear to interface the at least one sun gear with the reaction member to effect the first rotation speed of the output element in the first rotation direction.

16. The drive assembly of claim 1, wherein the planetary gear set includes at least one sun gear, at least one carrier and at least one ring gear; and wherein the second clutch arrangement locks the drive shaft to the at least one ring gear to effect the second rotation speed of the output element.

17. The drive assembly of claim 1, wherein the planetary gear set includes a first-stage sun gear coupled to the drive shaft; a first-stage carrier; a set of first-stage planet gears supported by the first-stage carrier and engaging the first-stage sun gear; a second-stage sun gear coupled to the first-stage carrier; a second-stage carrier; a set of second-stage planet gears supported by the second-stage carrier and engaging the second-stage sun gear; and a ring gear coupled to the output element and engaging the set of first-stage planet gears and the set of second-stage planet gears, wherein the first clutch arrangement is configured to at least indirectly engage with the second-stage carrier to ground with the reaction member to effect the first rotation speed of the output element, and wherein the second clutch arrangement at least indirectly engages the second-stage sun gear to ground with the reaction member to effect the second rotation speed of the output element.

18. The drive assembly of claim 17, wherein the planetary gear set includes at least one sleeve that has a first end rotationally fixed to the second-stage sun gear and a second end with a head portion, wherein a first clutch ring and a second clutch ring of the second clutch arrangement are arranged on the at least one sleeve axially in between the second-stage sun gear and the head portion, wherein the first clutch ring of the second clutch arrangement is configured to engage the head portion of the at least one sleeve to interface the second-stage sun gear with the reaction member to effect the second rotation speed of the output element in the second rotation direction, and wherein the second clutch ring of the second clutch arrangement is configured to engage the second-stage sun gear to interface the second-stage sun gear with the reaction member to effect the second rotation speed of the output element in the first rotation direction.

19. A drive assembly for a work vehicle comprising:

a drive housing including a first housing element forming a stationary reaction member;

a drive shaft rotatable about a drive axis relative to the stationary reaction member in a first rotation direction and alternatively a second rotation direction;

a planetary gear set coupled to the drive shaft and configured to selectively rotate an output element in the first rotation direction and in the second rotation direction, the planetary gear set having a first-stage sun gear coupled to the drive shaft; a first-stage carrier; a set of first-stage planet gears supported by the first-stage carrier and engaging the first-stage sun gear; a second-stage sun gear coupled to the first-stage carrier; a second-stage carrier; a set of second-stage planet gears supported by the second-stage carrier and engaging the second-stage sun gear; and a ring gear coupled to the output element and engaging the set of first-stage planet gears and the set of second-stage planet gears;

a low clutch arrangement coupled to the stationary reaction member and including a first clutch ring and a second clutch ring, wherein the first clutch ring of the low clutch arrangement is configured to interface the planetary gear set with the stationary reaction member to effect a first rotation speed of the output element in the second rotation direction and the second clutch ring of the low clutch arrangement is configured to interface the planetary gear set with the stationary reaction member to effect the first rotation speed of the output element in the first rotation direction;

a high clutch arrangement to interface with the planetary gear set to selectively effect a second rotation speed of the output element in the first rotation direction and in the second rotation direction;

at least one low actuator configured to effect movement of the low clutch arrangement along the drive axis to selectively engage the planetary gear set; and at least one high actuator configured to effect movement of the high clutch arrangement along the drive axis to selectively engage the planetary gear set.

20. The drive assembly of claim 19, wherein the first clutch ring of the low clutch arrangement is configured to at least indirectly ground the second-stage carrier with the stationary reaction member to effect the first rotation speed of the output element in the second rotation direction and the second clutch ring of the low clutch arrangement is configured to at least indirectly ground the second-stage carrier the stationary reaction member to effect the first rotation speed of the output element in the first rotation direction, wherein the high clutch arrangement is configured to at least indirectly rotationally fix the first-stage sun gear to the ring gear to effect the second rotation speed in the first rotation direction and in the second rotation direction, and wherein the drive assembly further includes a mid clutch arrangement coupled to the stationary reaction member and including a first clutch ring and a second clutch ring, wherein the first clutch ring of the mid clutch arrangement is configured to at least indirectly ground the second-stage sun gear with the stationary reaction member to effect a third rotation speed of the output element in the second rotation direction and the second clutch ring of the mid clutch arrangement is configured to at least indirectly ground the second-stage sun gear with the stationary reaction member to effect the third rotation speed of the output element in the first rotation direction.

\* \* \* \* \*